(12) United States Patent
Bandyopadhyay et al.

(10) Patent No.: US 10,279,578 B2
(45) Date of Patent: May 7, 2019

(54) ADDITIVE MANUFACTURING OF COMPOSITE MATERIALS WITH COMPOSITION GRADIENT

(71) Applicant: Washington State University, Pullman, WA (US)

(72) Inventors: Amit Bandyopadhyay, Pullman, WA (US); Susmita Bose, Pullman, WA (US); Thomas Gualtieri, Bothell, WA (US); Yanning Zhang, Pullman, WA (US)

(73) Assignee: Washington State University, Pullman, WA (US)

(*) Notice: Subject to any disclaimer, the term of this patent is extended or adjusted under 35 U.S.C. 154(b) by 0 days.

(21) Appl. No.: 15/628,145

(22) Filed: Jun. 20, 2017

(65) Prior Publication Data

US 2017/0361600 A1    Dec. 21, 2017

Related U.S. Application Data

(60) Provisional application No. 62/352,900, filed on Jun. 21, 2016.

(51) Int. Cl.
| | | |
|---|---|---|
| *B05D 3/00* | (2006.01) | |
| *C08J 7/18* | (2006.01) | |
| *G21H 5/00* | (2006.01) | |
| *B33Y 10/00* | (2015.01) | |
| *B33Y 80/00* | (2015.01) | |
| *B32B 15/04* | (2006.01) | |
| *B32B 9/00* | (2006.01) | |
| *B22F 7/02* | (2006.01) | |

(Continued)

(52) U.S. Cl.
CPC ............ *B33Y 10/00* (2014.12); *B22F 3/1055* (2013.01); *B22F 7/02* (2013.01); *B22F 7/08* (2013.01); *B32B 9/005* (2013.01); *B32B 15/04* (2013.01); *B33Y 80/00* (2014.12); *C04B 35/10* (2013.01); *C22C 1/10* (2013.01); *C22C 38/14* (2013.01); *B22F 2999/00* (2013.01); *C04B 2235/75* (2013.01); *Y02P 10/295* (2015.11)

(58) Field of Classification Search
CPC ........ B22F 2202/11; B22F 5/106; B22F 7/02; B33Y 10/00
See application file for complete search history.

(56) References Cited

U.S. PATENT DOCUMENTS 6,203,861 B1 *  3/2001  Kar .................. B22F 3/1055
                                                            264/497
6,401,001 B1 *  6/2002  Jang .................. H01L 21/288
                                                            204/192.15

(Continued)

*Primary Examiner* — Michael P Wieczorek
(74) *Attorney, Agent, or Firm* — Liang IP, PLLC

(57) ABSTRACT

Techniques of additive deposition for producing articles of manufacture are disclosed herein. In one embodiment, an article of manufacture can include a substrate having a surface and composed of a metal or metal alloy and multiple layers of composite materials deposited on the surface of the substrate. The composite materials is composed of the metal or metal alloy and a ceramic material. The individual composite materials at each of the multiple layers has a composition with a corresponding ratio between the metal or metal alloy material and the ceramic material. The ratios between the metal or metal alloy material and the ceramic material change along at least one dimension of the article of manufacture.

8 Claims, 20 Drawing Sheets

(51) Int. Cl.
*C22C 38/14* (2006.01)
*C04B 35/10* (2006.01)
*B22F 3/105* (2006.01)
*B22F 7/08* (2006.01)
*C22C 1/10* (2006.01)

(56) References Cited

U.S. PATENT DOCUMENTS

| | | | |
|---|---|---|---|
| 6,679,157 B2 * | 1/2004 | Chu | F41H 5/0421 428/539.5 |
| 6,811,744 B2 * | 11/2004 | Keicher | B05B 7/14 264/112 |

* cited by examiner

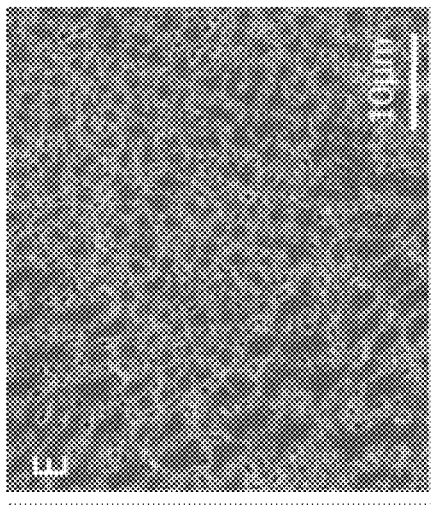
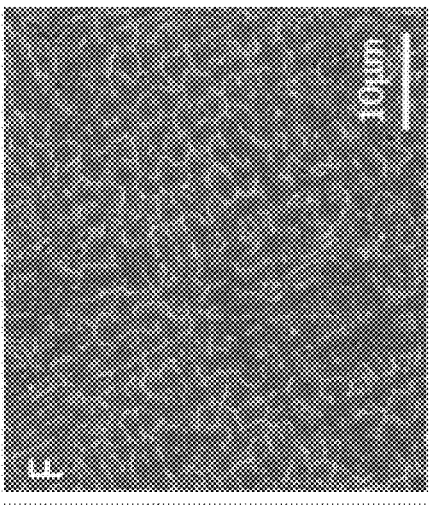
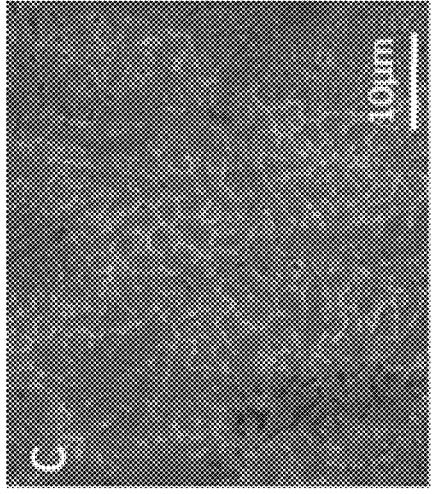
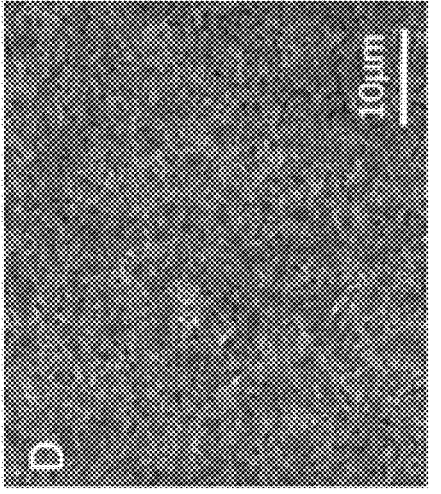
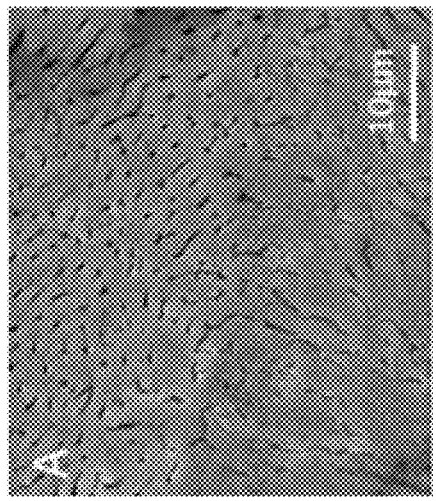
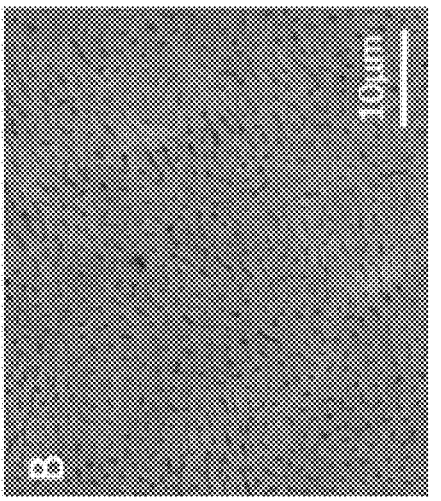

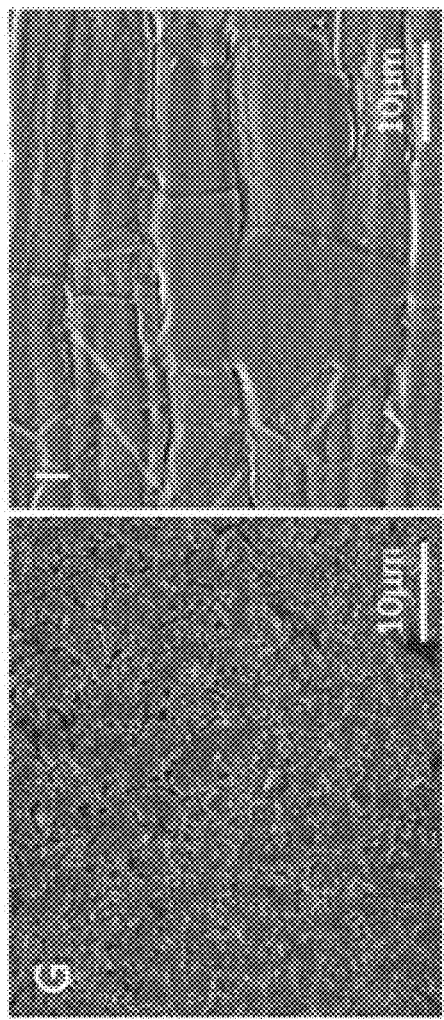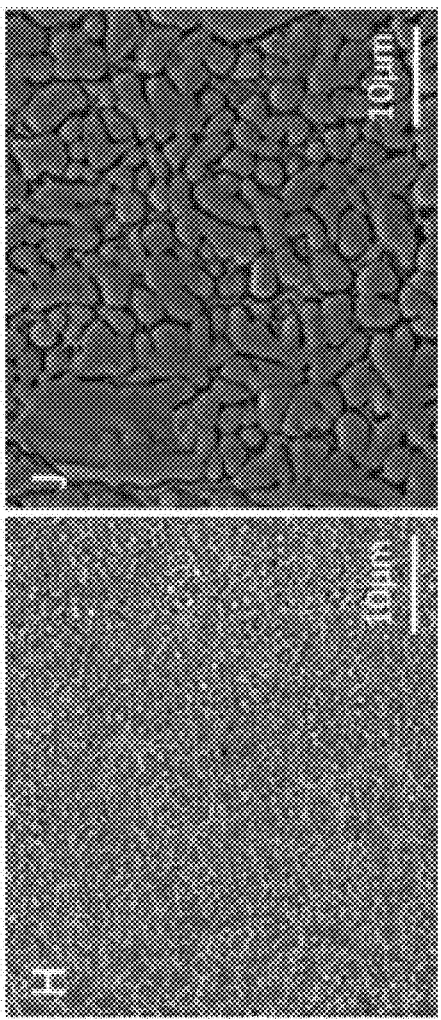
FIG. 6G  FIG. 6H  FIG. 6I  FIG. 6J

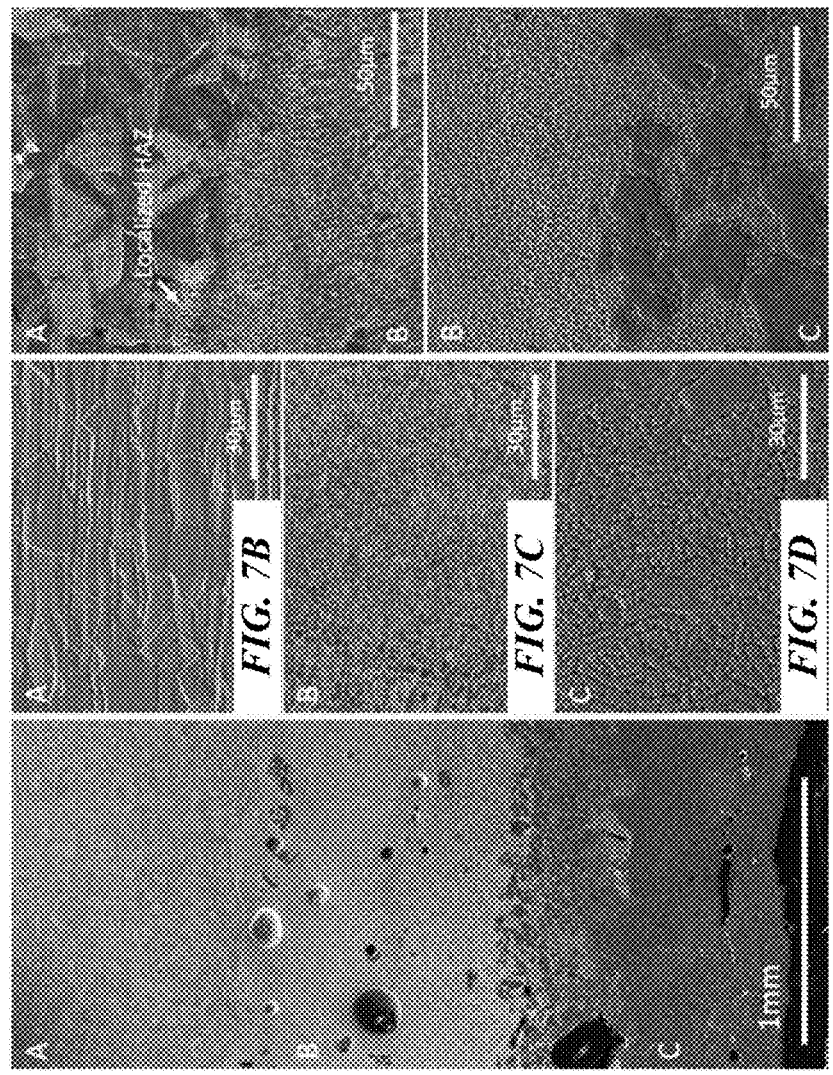

ADDITIVE MANUFACTURING OF COMPOSITE MATERIALS WITH COMPOSITION GRADIENT

CROSS-REFERENCE TO RELATED APPLICATION(S)

This application claims priority to U.S. Provisional Application No. 62/352,900, filed on Jun. 21, 2016, the disclosure of which is incorporated herein in its entirety.

BACKGROUND

Ceramic or other types of coatings are widely used to protect structures and devices from thermal, chemical, or mechanical damages. For example, titanium nitride (TiN), titanium carbide (TiC), aluminum oxide ($Al_2O_3$), titanium aluminum nitride (TiAlN), vanadium carbide (VC), and titanium boron nitride (TiBN) ceramic coatings have been widely used on dies, cutting tools, and other items. These coatings have high hardness, great wear resistance, and excellent thermal stability. Fabrication techniques of such coatings typically include chemical vapor deposition ("CVD"), physical vapor deposition ("PVD"), or thermal spray techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Depositing ultra-high temperature ceramic coatings such as vanadium carbide and aluminum oxide to a dissimilar substrate such as a metal substrate can be challenging. Applying deposition techniques such as CVD, PVD, and plasma spraying has various drawbacks. For example, CVD is a gas based process in which gaseous precursor reactants react to form a solid coating on a substrate surface. CVD, however, can only deposit a relatively thin layer on the substrate surface. In contrast, PVD is a technique in which vaporized coating materials condense onto a substrate surface without chemical reactions. However, coatings formed using PVD may be uneven over sections of a substrate surface especially when the substrate has complex geometries. Plasma spraying, wire arc spraying, high velocity oxy-fuel are some thermal spraying techniques in which coating materials are heated to a molten or semi-molten state before being sprayed onto a substrate surface. Compared to CVD and PVD, thermal spray techniques can have higher deposition rates. However, the foregoing techniques are generally limited to little or no flexibility in compositional control. Instead, applying the foregoing techniques typically result in a fully ceramic coating with no transition between the coating and a substrate, resulting in high probabilities of cracking, delamination, and stress fracture at high temperatures due to large mismatch in coefficient of thermal expansion.

Several embodiments of the disclosed technology are directed to additive deposition techniques (sometimes referred to as 3D printing, layered manufacturing, solid freeform fabrication, or rapid prototyping) in which compositional variations can be controlled to form a gradual change in compositions and thus material properties in a bulk product. Experiments have shown that such gradual changes in material properties are correlated to significant decreases in the likelihood of cracking, delamination, and stress fracture of ceramics in the bulk products. As presented herein, embodiments of the present technology can be applied to produce bulk products with varying compositions from 100% metal to 100% ceramic in one operation to reduce the likelihood of failures from material property mismatch. Such an approach can also be used towards repair of parts with added functionality.

As discussed in more detail later, one implementation of the present technology involves applying laser engineered net shaping (LENS™) to manufacture bulk products having compositionally gradient structures of vanadium carbide (VC) and stainless steel. Another implementation of the present technology involves applying LENS to manufacture bulk products having compositionally gradient structures of aluminum oxide ($Al_2O_3$) and titanium (Ti). For example, during a LENS operation, multiple precursor materials (e.g., metals, salts, or ceramics) can be simultaneously fed into a focal point of an energy stream (e.g., laser, microwave, electron beam, etc.). The energy stream then causes the precursor materials to melt and form a layer or a section of a layer of composite material on a substrate. Repetitions or continuation of such feeding, reacting, and forming operations can form successive sections and/or layers of a target product.

During deposition of a layer or section of a layer, various operating parameters can be adjusted to achieve a desired composition, physical parameter (e.g., hardness), sectional composition gradient, or other desired characteristics of the final product on the same or different layers or sections of the bulk product. For instance, in one embodiment, one or more feed rates of the precursor materials can be adjusted to achieve a target composition or sectional composition gradient. The target composition gradient can be tuned, for example, via experimentation, to be sufficient to avoid or at least reduce a risk of cracking, delamination, and stress fracture at high temperatures due to large mismatch in coefficient of thermal expansion in the target product. In other embodiments, one or more of a laser power, scanning speed, or other operating parameters of the laser can be adjusted to achieve the target characteristics of the final bulk product.

Several embodiments of the disclosed technology can efficiently and cost effectively produce bulk final products having both one or more metals and one or more ceramic materials with desired profiles of structure, composition gradient, crystallinity, and/or other physical properties. In particular, several embodiments of the disclosed technology are suitable for producing bulk products having high melting point ceramic coatings with significantly reduced tendencies for cracking, delamination, stress fracture, or other failures due to material mismatch. Unlike CVD, PVD, or thermal spraying techniques, several embodiments of the disclosed technology are more flexible in achieving the desired profiles of composition gradients and material properties. For instance, thermal spraying can only deposit a melted initial composition of a coating material onto a substrate. In contrast, several embodiments of the disclosed technology can allow great flexibility in compositional control during deposition by varying, for example, feed rates or feed ratio between metal and ceramic precursor materials to form a bulk product having a desired compositions within a layer of the bulk product, over multiple layers of the bulk product, or in other suitable basis.

BRIEF DESCRIPTION OF THE DRAWINGS

FIGS. 6A-6J are example Scanning Electron Microscope ("SEM") images showing microstructures of different coatings of SS304, SS304-1LP, 5% VC, 5% VC-1LP, 10% VC, 10% VC-1LP, 20% VC, 20% VC-1LP, plate SS304, 100% VC, respectively, in accordance with embodiments of the disclosed technology.

FIGS. 7A-7F are example SEM images of 100% VC-20% VC-SS304 gradient coating, respectively, in accordance with embodiments of the disclosed technology. In FIGS. 7A-7F, "A" designates plate SS304; "B" designates 20% VC; and "C" designates 100% VC.

DETAILED DESCRIPTION

Certain embodiments of systems, devices, articles of manufacture, and processes for additive deposition are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-22.

As used herein, the term "additive deposition" generally refers to a deposition process in which one or more precursor materials are melted by an energy source before being deposited onto a substrate in a line-by-line, layer-by-layer, or section-by-section manner to form a composite product. The formed composite product can have a compositional and/or structural gradient along at least one dimension. In one example, vanadium carbide (VC) can be formed on a stainless steel substrate with a composition gradient of from 100% stainless steel to 100% VC along at least one dimension. In other examples, titanium nitride (TiN), titanium silicon nitride (Ti—Si—N), aluminum oxide ($Al_2O_3$) can also be deposited on titanium (Ti) or other suitable types of substrate. These examples, however, are for illustration purposes only. Several embodiments of the disclosed technology can be applied to form products of other suitable composite materials.

Also used herein, the term "phase" generally refers to a physical state in which a material segment, for example, of a composite material, has a generally homogeneous chemical composition, crystalline structure, or other physical properties. In one example, a final product can have a substrate material with a substrate phase and multiple composite phases with varying percentages of one or more ceramic materials. The substrate phase (e.g., stainless steel) can have different chemical composition, crystalline structure, hardness, wear characteristics, or other physical properties than those of the composite phases (e.g., 10%, 20%, or 100% VC, etc.).

Figure 1:
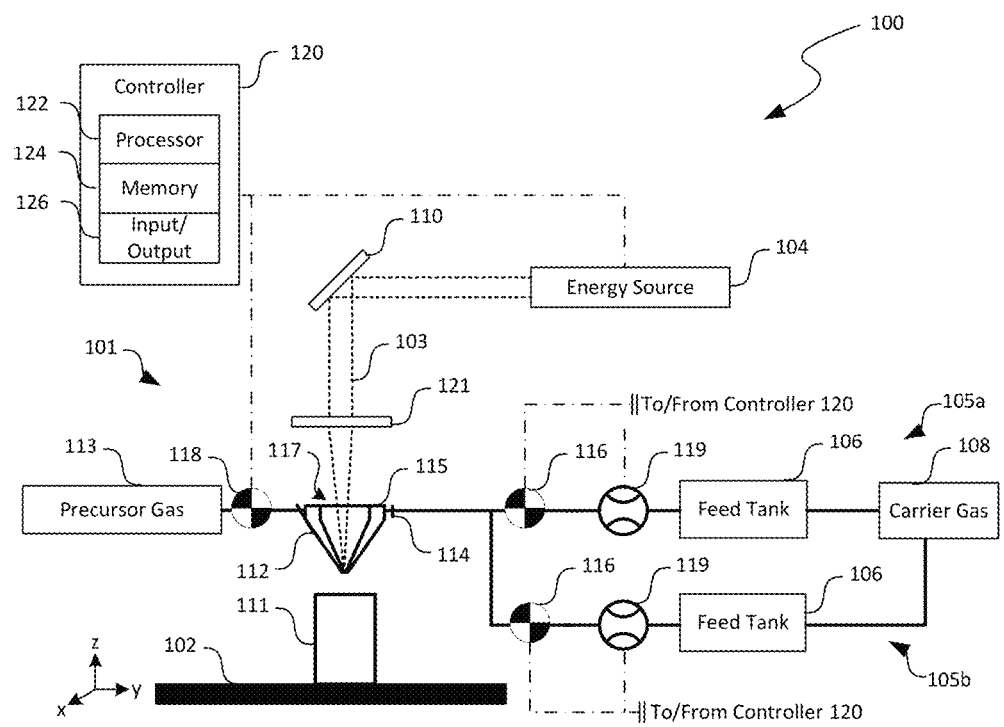
FIG. 1 is a schematic diagram of an additive deposition system in accordance with embodiments of the disclosed technology.

FIG. 1 is a schematic diagram of an additive deposition system 100 in accordance with embodiments of the disclosed technology. As shown in FIG. 1, the additive deposition system 100 can include a deposition platform 102, an energy source 104, a first feed line 105a, a second feed line 105b, and a controller 120 operatively coupled to one another. Even though particular components are illustrated in FIG. 1, in other embodiments, the additive deposition system 100 can also include power supplies, purge gas supplies, and/or other suitable components.

As shown in FIG. 1, the deposition platform 102 can be configured to carry a substrate having a substrate material (e.g., stainless steel, Ti, etc.) or a formed product 111 (shown as a cylinder for illustration purposes). The deposition platform 102 can also be configured to move in x-, y-, and z-axis in a raster scan, continuous scan, or other suitable manners. In certain embodiments, the deposition platform 102 can be coupled to one or more electric motors controlled by a logic processor (not shown) to perform various scanning operations. In other embodiments, the deposition platform 102 can be coupled to pneumatic actuators and/or other suitable types of drives configured to perform the scanning operations.

The energy source 104 can be configured to provide an energy stream 103 into a deposition environment 101. In certain embodiments, the energy source 104 can include an Nd:YAG or any other suitable types of laser capable of delivering sufficient energy to the deposition environment 101. In other embodiments, the energy source 104 can also include microwave, plasma, electron beam, induction heating, resistance heating, or other suitable types of energy sources. In the illustrated embodiment, the additive deposition system 100 also includes a reflector 110 (e.g., a mirror) and a focusing lens 121 configured to cooperatively direct the energy stream 103 into the deposition environment 101. In other embodiments, the additive deposition system 100 can also include collimators, filters, and/or other suitable optical and/or mechanical components (not shown) configured to direct and deliver the energy stream 103 into the deposition environment 101. In further embodiments, one or more of the reflector 110 or the focusing lens 121 may be omitted.

The first and second feed lines 105a and 105b can be configured to deliver first and second precursor materials (e.g., metallic powders, ceramic powders, or a mixture thereof) to the deposition environment 101, respectively. For example, the first precursor material can include a metal or metal alloy of aluminum (Al), iron (Fe), titanium (Ti), cobalt (Co), chromium (Cr), zirconium (Zr), niobium (Nb), tantalum (Ta), tungsten (W), copper (Cu), or nickel (Ni). The second precursor material can include a metal or non-metallic elemental solid based carbide, oxide, nitride, or boride in which the metallic or non-metallic elemental solid composition is of titanium (Ti), vanadium (V), Nickle (Ni), tungsten (W), niobium (Nb), silicon (Si), aluminum (Al), tantalum (Ta), zirconium (Zr), chromium (Cr), or cobalt (Co). In the illustrated embodiment, each feed line 105a and 105b includes a feed tank 106, a valve 116, and a feed rate sensor 119. The valves 116 can each include a gate value, a globe valve, or other suitable types of valves. The feed rate sensor 119 can each include a mass meter, a volume meter, or other suitable types of meter.

The feed tanks 106 can individually include a storage enclosure suitable for storing a corresponding precursor material. The precursor materials can include can include elemental metals (e.g., titanium, aluminum, nickel, silver, etc.) or metal alloys (e.g., stainless steel) to form intermetallic alloys (e.g., VC, Ti/Al$_2$O$_3$, TiAl, TiNi, TiAlNi, etc.). In other embodiments, the precursor materials can include ceramic materials (e.g., BrN2) that can react or otherwise combine with an elemental metal (e.g., Ti) to form high melting point composite materials (e.g., TiBr, TiBr2, TiN, etc.).

In the illustrated embodiment, both the first and second feed lines 105a and 105b are coupled to a carrier gas source 108 containing argon (Ar) or other suitable inert gases. The carrier gas source 108 can be configured to provide sufficient pressure to force the first and second precursor materials from the feed tanks 106 into the deposition environment 101. In other embodiments, each of the first and second feed lines 105a and 105b can include corresponding carrier gas sources (not shown). Even though two feed lines 105a and 105b are shown in FIG. 1 for illustration, in further embodiments, the additive deposition system 100 can include one, three, four, six, eight, or any suitable number of feed lines (not shown).

As shown in FIG. 1, the additive deposition system 100 can also include an optional precursor gas source 113. The precursor gas source 113 can be configured to contain a precursor gas (e.g., nitrogen, oxygen, carbon dioxide, etc.) and provide the precursor gas to the deposition environment 101 via a valve 118. In certain embodiments, the additive deposition system 100 can include more than one precursor gas source 113 containing different precursor gases. In other embodiments, the precursor gas source 113 may be omitted.

In the illustrated embodiment, the additive deposition system 100 includes a deposition head 112 configured to facilitate aligning the precursor materials from the first and/or second feed lines 105a and 105b with the energy stream 103. The deposition head 112 can include one or more feed ports 114 configured to receive the precursor materials from the first and/or second feed lines 105a and 105b or the optional precursor gas from the precursor gas source 113. The deposition head 114 can also include an opening 117 to receive the energy stream 103. In the illustrated embodiment, the deposition head 112 has a generally conical shape such that precursor materials can be exposed to the energy stream 103 at or near a focal point or plane of the energy stream 103. In other embodiments, the deposition head 112 can have other suitable shapes and/or structures. In further embodiments, the deposition head 112 may be omitted. Instead, the first and second precursor materials may be deposited directly onto the deposition platform 102 at or near a focal point or plane of the energy stream 103.

The controller 120 can include a processor 122 coupled to a memory 124 and an input/output component 126. The processor 122 can include a microprocessor, a field-programmable gate array, and/or other suitable logic devices. The memory 124 can include volatile and/or nonvolatile computer readable media (e.g., ROM; RAM, magnetic disk storage media; optical storage media; flash memory devices, EEPROM, and/or other suitable non-transitory storage media) configured to store data received from, as well as instructions for, the processor 122. In one embodiment, both the data and instructions are stored in one computer readable medium. In other embodiments, the data may be stored in one medium (e.g., RAM), and the instructions may be stored in a different medium (e.g., EEPROM). The input/output component 126 can include a display, a touch screen, a keyboard, a track ball, a gauge or dial, and/or other suitable types of input/output devices.

In certain embodiments, the controller 120 can include a computer operatively coupled to the other components of the additive deposition system 100 via a hardwire communication link (e.g., a USB link, an Ethernet link, an RS232 link, etc.). In other embodiments, the controller 120 can include a logic processor operatively coupled to the other components of the additive deposition system 100 via a wireless connection (e.g., a WIFI link, a Bluetooth link, etc.). In further embodiments, the controller 120 can include an application specific integrated circuit, a system-on-chip circuit, a programmable logic controller, and/or other suitable computing frameworks In operation, the controller 120 can receive a desired design file for a target product or article of manufacture, for example, in the form of a computer aided design ("CAD") or other suitable types of file. The design file (or a separate file) can also specify at least one of a composition, a composition gradient, a crystalline structure, or a desired physical properties for one or more segments of the target product. In response, the controller 120 can analyze the design file and generate a recipe having a sequence of operations to form the product via additive deposition in layer-by-layer, section-by-section, or other suitable accumulative fashion.

In one embodiment, the controller 120 can instruct the first and second feed lines 105a and 105b to provide first and/or second precursor materials at spatially and/or temporally varying feed ratios determined based on the design file to the deposition head 112. For example, the feed ratios can be varied along one or more of the x-, y-, or z-axis such that one end of the target product 111 has a first composition (e.g., 100% metal) while the other end of the target product 111 has a second composition (e.g., 100% ceramics). Such composition gradient can be linear, parabolic, elliptical, step-wise, or in other suitable relationship with respect to the x-, y-, or z-axis.

In other embodiments, the controller 120 can also instruct the energy source 104 to provide the energy stream 103 at certain intensity levels to the deposition head 112 to melt the first and second precursor materials, and thus causing the first and second precursor materials to form a composite material having the desired thickness, composition, crystalline structure, or physical properties as specified in the design file. In further embodiments, the energy stream 103 can be at other intensity levels to cause the first and second precursor materials to react by partially melting or without melting the first and/or second precursor materials.

During scanning, the controller 120 can instruct the deposition platform 102 to move the composite material away from the focal point or plane of the energy stream 103 such that the composite material solidifies forming a layer or a portion of the target product 111. In other embodiments, the provided energy stream 103 can also melt a portion of the substrate material (e.g., Ti) of the substrate, thereby causing the substrate material to react with the first and/or second precursor materials to form the composite material. The foregoing operations can then be repeated on the formed layer or portion in, for example, a layer-by-layer manner until the entire product is completed.

In certain embodiments, foregoing deposition operations can be performed in the deposition environment 101 having an inert gas (e.g., argon). The controller 120 can also instruct the valve 118 to open and thus introduce a precursor gas (e.g., nitrogen, oxygen, carbon dioxide, etc.) into the deposition environment 101 when building certain layer or section of the product. The precursor gas can thus at least partially displace the inert gas and react with the first and/or second precursor materials to form a new phase in the product. For example, introducing nitrogen into the deposition environment 101 having a titanium substrate material can form titanium nitride. In another example, introducing carbon dioxide into the deposition environment 101 can form titanium carbide. In other embodiments, the controller 120 can also instruct the energy source 104 to adjust at least one of a laser power or scanning speed based on a desired property for a segment of the product. In further embodiments, the controller 120 can instruct all of the foregoing components of the additive deposition system 100 in any suitable manners.

Unlike CVD, PVD, or thermal spraying techniques, several embodiments of the additive deposition system 100 can be more flexible in achieving a desired transition of compositions, properties, or other characteristics for the target product 111. For instance, several embodiments of the additive deposition system 100 can be flexible in structural, compositional, dimensional, and property control during deposition by dynamically varying, for example, feed rates or feed ratio of the first and/or second precursor materials, by introducing the precursor gas, by adjusting at least one of power or scanning speed of the energy source 104, and/or manipulating other suitable operating parameters.

Due at least in part to such flexibility, several embodiments of the additive deposition system 100 can efficiently and cost effectively produce products and articles with reduced risks of cracking, delamination, stress fracture or other failures. For example, in certain embodiments, the target product 111 can be formed by depositing layers of the composite material in a sequential manner. Each layer of the composite material can have a different ratio of metal and ceramic compositions to achieve a gradual transition from a mainly metallic composition to a mainly ceramic composition. As discussed in more detail later, such gradual transition (or the ability to control and achieve such gradual transition) can allow significantly reduction of risks of cracking, delamination, and stress fracture at high temperatures due to large mismatch in coefficient of thermal expansion between the metallic and ceramic materials.

As such, the formed target product 111 can have the desired shape and dimension with, for example, a target composition gradient, crystallinity, hardness, wear characteristics, or other physical properties along a length, radius, or other dimensions of the target product 111. For instance, the target product 111 can include a cylinder having a first cylindrical section with a composition, crystallinity, or other properties different than a second cylindrical section along a length of the cylinder. In another example, the target product 111 can include another cylinder having a core section with a composition, crystallinity, or other properties different than a peripheral section along a radius of the cylinder. In a further example, the target product 111 can include a cylinder having gradients of composition, crystallinity, or other properties along both the length and radius of the cylinder.

Figure 2:
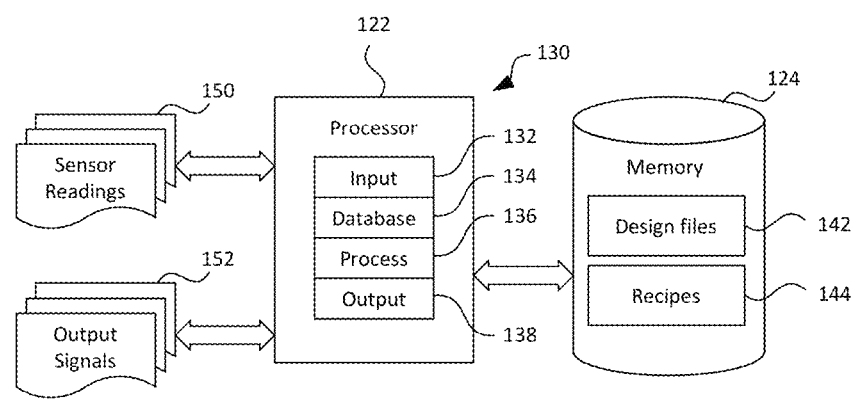
FIG. 2 is a block diagram showing computing system software components suitable for the additive deposition system of FIG. 1 in accordance with embodiments of the disclosed technology.

FIG. 2 is a block diagram showing computing system software components 130 suitable for the controller 120 in FIG. 1 in accordance with embodiments of the present technology. Each component may be a computer program, procedure, or process written as source code in a conventional programming language, such as the C++ programming language, or other computer code, and may be presented for execution by the processor 122 of the controller 120. The various implementations of the source code and object byte codes may be stored in the memory 124. The software components 130 of the controller 120 may include an input component 132, a database component 134, a process component 136, and an output component 138.

In operation, the input component 132 may accept an operator input, such as a design file for the product in FIG. 1, and communicates the accepted information or selections to other components for further processing. The database component 134 organizes records, including design files 142 and recipes 144 (e.g., steering and/or lane variability), and facilitates storing and retrieving of these records to and from the memory 124. Any type of database organization may be utilized, including a flat file system, hierarchical database, relational database, or distributed database, such as provided by a database vendor such as the Oracle Corporation, Redwood Shores, Calif. The process component 136 analyzes sensor readings 150 from sensors (e.g., from the feed rate sensors 119) and/or other data sources, and the output component 138 generates output signals 152 based on the analyzed sensor readings 150. Embodiments of the process component 136 are described in more detail below with reference to FIG. 3.

Figure 3:
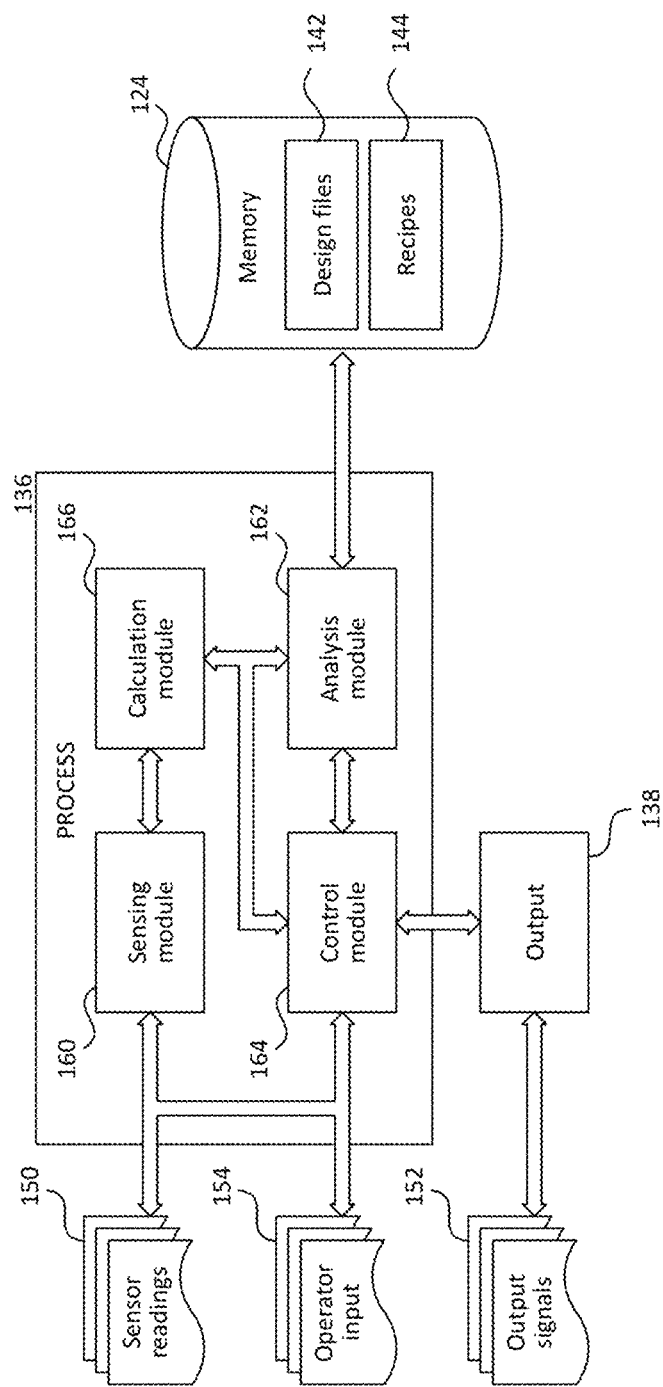
FIG. 3 is a block diagram showing software modules suitable for the process component of FIG. 2 in accordance with embodiments of the disclosed technology.

FIG. 3 is a block diagram showing embodiments of the process component 136 of FIG. 2. As shown in FIG. 3, the process component 136 may further include a sensing module 160, an analysis module 162, a control module 164, and a calculation module 166 interconnected with one other. Each module may be a computer program, procedure, or routine written as source code in a conventional programming language, or one or more modules may be hardware modules.

The sensing module 330 is configured to receive and convert the sensor readings 150 into parameters in desired units. For example, the sensing module 160 may receive the sensor readings 150 from the feed rate sensors 119 of FIG. 1 as electrical signals (e.g., a voltage or a current) and convert the electrical signals into a flow rate in engineering units. The sensing module 160 may have routines including, for example, linear interpolation, logarithmic interpolation, data mapping, or other routines to associate the sensor readings 150 to parameters in desired units.

The calculation module 166 may include routines configured to perform various types of calculation to facilitate operation of other modules. For example, the calculation module 166 may include counters, timers, and/or other suitable accumulation routines for deriving a standard deviation, variance, root mean square, and/or other suitable metrics.

The analysis module 162 may be configured to analyze received sensor readings 150 from the sensing module 160 and determine whether the sensor readings 150 are in conformance with the recipe 144. In certain embodiments, the analysis module 162 may indicate that the sensor readings 150 are not in conformance with the recipe 144. As such, the analysis module 162 can indicate to the control module 164 that an adjustment is needed. In other embodiments, the analysis module may indicate that the sensor readings 150 are in conformance with the recipe 144. As such, an adjustment by the control module 164 is not needed.

The control module 164 can be configured to control the operation of the additive deposition system 100 of FIG. 1 if the sensor readings 150 are not in conformance with the recipe 144. For example, the control module 164 may include a feedback routine (e.g., a proportional-integral or proportional-integral-differential routine) that generates one of the output signals 152 (e.g., a control signal of valve position) to the output module 138. In further example, the control module 164 may perform other suitable control operations to improve and/or maintain a deposition operation based on operator input 154 and/or other suitable input.

Figure 4A:
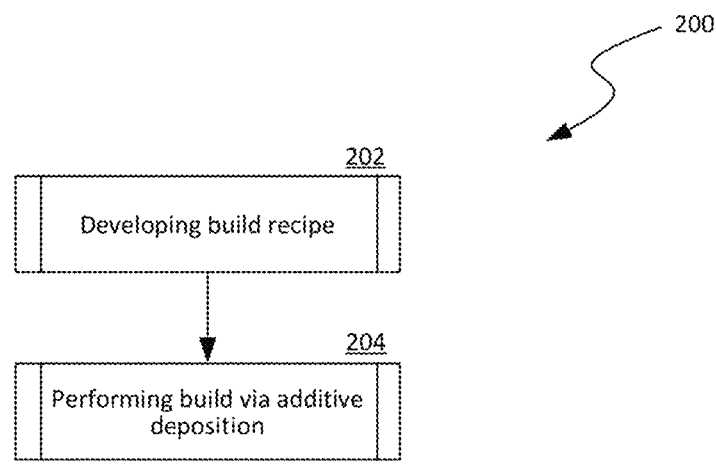
FIGS. 4A-4D are flowcharts showing methods for additive deposition of a composite material in accordance with embodiments of the disclosed technology.

FIG. 4A is a flowchart showing a method 200 for additive deposition in accordance with embodiments of the present technology. Even though the method 200 is described below with reference to the additive deposition system 100 of FIG. 1 and the software modules of FIGS. 2 and 3, the method 200 may also be applied in other systems with additional or different hardware and/or software components.

As shown in FIG. 4A, the method 200 includes developing a build recipe at stage 202, for instance, utilizing the controller 120 of FIG. 1. In one embodiment, a build recipe can include a sequence of operations and operating parameters for each operation in the sequence. Example operating parameters can include feed rates of precursor materials from first and/or second feed lines 105a and 105b, power of the energy source 104, speed and direction of movement of the deposition platform 102, introduction of the precursor gas from the precursor gas source 113, and/or other suitable parameters. In other embodiments, a build recipe can include adjustment of operating parameters of sequential operations or other suitable information. Example operations of developing a build recipe are discussed in more detail below with reference to FIG. 4B.

The method 200 can also include performing a build via additive deposition based on the developed build recipe at stage 204. For example, in certain embodiments, one or more precursor materials in a determined proportion can be instructed into a deposition environment in which the precursor materials are melted and reacted with one another and/or with a substrate material to form a composite material. The formed composite material can then be allowed to solidify and deposited onto a substrate. The foregoing operations can then be repeated based on the developed build recipe until the product (FIG. 1) is completed. Example operations of performing a build based on the developed recipe are discussed in more detail below with reference to FIG. 4C.

Figure 4B:
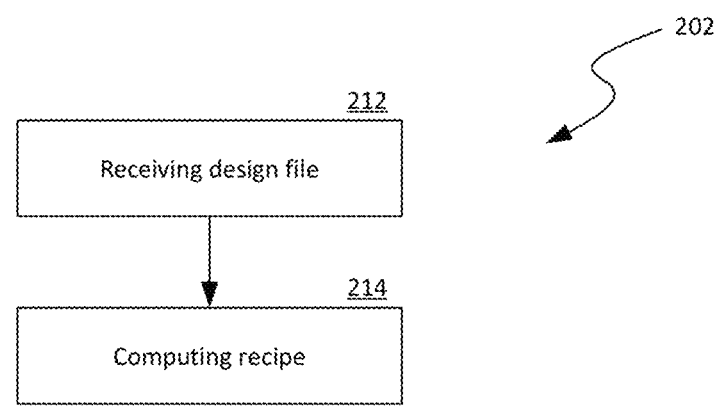

FIG. 4B is a flowchart illustrating a process 202 of developing a build recipe in accordance with embodiments of the disclosed technology. As shown in FIG. 4B, the process 202 can include receiving a design file for the product at stage 212. In one embodiment, the design file can include a CAD file. In other embodiments, the design file can include any suitable types of file specifying a shape, composition, composition variation, dimension, or physical property of the product.

The process 202 can also include computing a recipe based on the received design file at stage 214. In one embodiment, computing the recipe can include constructing a sequence of operations to build the product in a layer-by-layer, section-by-section, or other suitable manners. Each operation sequence in the sequence can be associated with one or more operating parameters discussed above with reference to FIG. 4A.

Figure 4C:
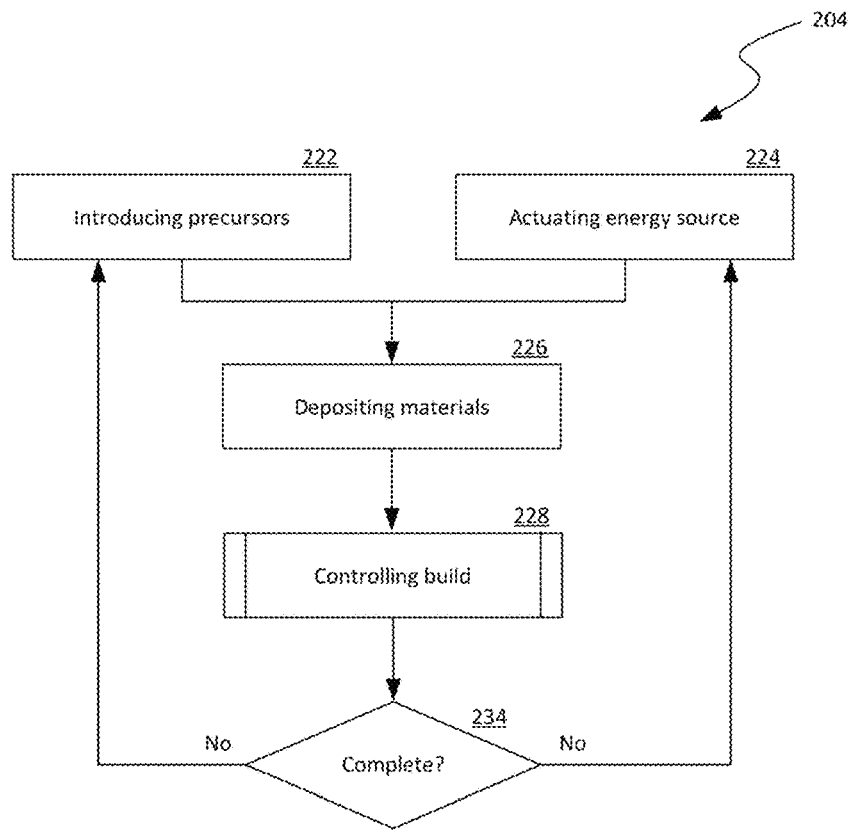

FIG. 4C is a flowchart illustrating a process 202 of performing a build in accordance with embodiments of the disclosed technology. As shown in FIG. 4C, the process 202 can include introducing one or more precursor materials at stage 222 and actuating an energy source (e.g., a laser) at stage 224. Even though the operations at stages 222 and 224 are shown as concurrent in FIG. 4C, in other embodiments, these operations may be performed sequentially or in other suitable manners. The process 204 can also include deposition a composite material onto, for example, a substrate or unfinished product at stage 226.

The process 204 can further include controlling the build by varying one or more operating parameters based on the developed recipe at stage 228, as described in more detail below with reference to FIG. 4D. The process 204 can then include a decision stage to determine whether the build is completed. If the product is complete, the process 204 ends; otherwise, the process 204 reverts to introducing precursor materials at stage 222 and actuating laser scanning at stage 224.

Figure 4D:
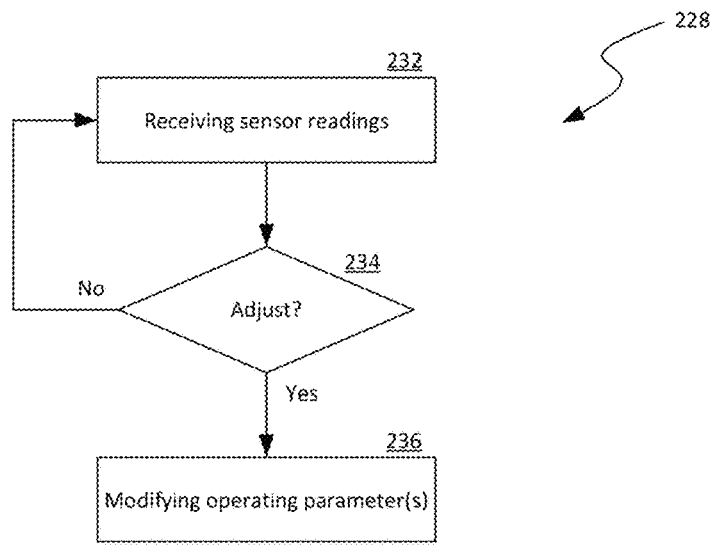

FIG. 4D is a flowchart illustrating a process 228 of controlling a build in accordance with embodiments of the disclosed technology. As shown in FIG. 4D, the process 228 can include receiving sensor readings at stage 232. Example sensor readings can be from the feed rate sensors 119 of FIG. 1. The process 228 can then include a decision stage 234 to determine if adjustment is needed based on, for example, a comparison of the received sensor readings and the developed recipe. If adjustment is needed, the process 228 can include modifying the operating parameters at stage 236. For instance, at least one of the feed rates of the precursors can be modified such that a ratio of the precursor materials and a composition of a resulting composite material can be varied. In one example, the ratios of the precursor materials can be varied to result in a structure having composite materials with compositions transitioning from 100% metal to 100% ceramic. In another example, the ratios of the precursor materials can be varied to result in composite materials with compositions transitioning from 100% metal to 100% ceramic, and back to 100% metal. In further examples, the ratios of the precursor materials can be varied to result in composite materials with other suitable transitioning compositions.

Without being bound by theory, it is believed that a sufficiently gradual composition transition in the resulting structures can allow further deposition of additional composite materials onto a surface containing mostly if not all ceramic materials. For example, as discussed below with reference to FIG. 14, a structure having a pure $Al_2O_3$ layer sandwiched between two $Ti_6Al_4V+Al_2O_3$ layers were successfully formed. Unlike structures obtained from CVD, PVD, or other deposition techniques, it is believed that the gradual composition transition can significantly improve tolerance to thermal shocks due to a mismatch in coefficient of thermal expansion of components in the composite materials (e.g., between pure $Al_2O_3$ and $Ti_6Al_4V+Al_2O_3$ materials). As such, cracking, delamination, stress fracture, of other types of failures due to mismatch in coefficient of thermal expansion can be reduced or even prevented.

Certain experiments were conducted to form structures having composite materials with transitioning compositions using an additive deposition system generally similar to that shown in FIG. 1. In one experiment, structures having composition materials of vanadium carbide and stainless steel with transitioning compositions were studied. In another experiment, structures having composition materials of a titanium alloy ($Ti_6Al_4V$) and aluminum oxide with transitioning compositions were studied. Experimental materials, procedures, and results are described in more detail below.

Processing of Vanadium Carbide (VC) on Stainless Steel 304 (SS304)

Surface modification is one approach for enhancing wear resistance of components. Many hard and high modulus materials can be used as coatings for increased wear resistance. For example, VC coatings have been used to protect tools from wear damage, improve mechanical properties, lengthen service life, and increase corrosion resistance. VC is a hard refractory ceramic that has excellent wear resistance, high elastic modulus (400 GPa) and melting temperature, and good strength retention even at high temperature. VC has shown to increase protective properties when added to steel either as a coating or as a reinforcement phase in metal matrix composites ("MMC").

VC can be used to make a protective coating on steels in a few different ways. VC can be diffused into grains and strengthen lattice by substitution, or can be added as a precipitate and dispersed in the steel. These precipitates are believed to cause internal stress and increase both hardness and strength. This technique can be used to enhance properties in cast iron and steels to increase wear and corrosion resistance. Carbides can also be deposited on a surface of a metallic component as a 100% VC coating to improve wear resistance.

Techniques for forming a VC or other vanadium compound coatings include thermal-reactive diffusion ("TRD"), CVD, and PVD, all of which involve certain drawbacks. For example, CVD requires high processing temperatures while PVD needs expensive equipment and generally results in a weaker coating due to limited diffusion. TRD is also limited by diffusion and can only yield coatings with a small depth and limited coating thickness.

Several embodiments of the disclosed technology can be applied to form a VC coating with a large depth and a designed gradient in composition and/or material properties to reduce the risks of cracking, delamination, or other failures of the formed VC coating. In one example, a compositionally gradient structure varying compositions from 100% metal to 100% ceramic was formed by using an additive deposition system generally similar to that shown in FIG. 1. As discussed in more detail below, via additive manufacturing disclosed herein, not only the shape and/or size of the target product 111 (FIG. 1) can be controlled, but the composition and/or properties at different locations of the target product 111 can be tailored.

Materials and Methods

VC powder was obtained from American Elements® with 99% purity and a particle size of −100/+270 mesh. Stainless steel 304/304L (SS304) powder was obtained from Carpenter® with a powder size of −140/+325 mesh. The composition of the powder is listed in Table 1 below.

TABLE 1

| Chemical Compositions of Materials Used (wt. %) | | | | | | | |
|---|---|---|---|---|---|---|---|
| C | Cr | Ni | P | Si | Mn | S | N |
| 304/304L Plate |||||||||
| 0.022 | 18.15 | 8.05 | 0.033 | 0.44 | 1.72 | 0.0003 | 0.07 |
| 304/30L Powder |||||||||
| 0.03 | 18 to 20 | 8 to 12 | 0.045 | 1 | 2 | 0.030 | — |

SS304 and VC powders were mixed in proportions of 0%, 5%, 10%, and 20% wt.VC. Powders were weighed and mixed on a ball mill for one hour to ensure thorough mixing and homogeneity. As referred to hereafter, coatings deposited on SS304 substrates are referred to by respective VC content. Hot rolled SS304 substrates were obtained from Penn Stainless Products and associated constituent elements are listed in Table 1 above.

Coatings were made using a LENS 750 (Optomec Inc., Albuquerque, N. Mex.) additive system configured to deposit powders under a Nd:YAG laser using argon transport. The powder flows under the laser to be melted and solidified on the substrate. The base plate moves in the x and y directions, while the head moves in the z. Build parameters were chosen and as listed in Table 2 below. All samples were made in argon gas environment with oxygen levels below 30ppm.

TABLE 2

Build Parameters of different compositions[†]

|  | Hatch (in.) | Angle (°) | Slice (in) | PF* (g/min) | Power (W) |
|---|---|---|---|---|---|
| All Compositions[‡] | 0.015 | [0, 90]° | 0.015 | 27.6 | 580 |
| 100% VC | 0.015 | [0, 90]° | 0.015 | 21.0 | 650 |

*Powder feed rate is estimated by calculation of other powders feed rates, and difference in densities leaves some error
[†]All laser passes were done at the power as the deposition of the coating
[‡]All compositions except 100% VC For each sample, two layers were deposited in a 10.7 mm×14.7 mm rectangle with one contour. The only exception was the 100% VC, which was deposited twice on top of a 20% VC sample to make a gradient coating. For each composition, a sample was also made with an additional laser pass. Thus, after the second layer was deposited, the powder feeder was shut off and the laser was run over the sample again at the same speed and power to further densify the surface of the coating. A sample was also made with a laser pass on each layer to see if that helped densify the coating. Also, to show a gradient filling on a broken part, a 12 mm diameter cylinder was built with twenty layers of 10% VC, twenty layers of 20% VC, and five layers of 100% VC. All build parameters remained the same for the respective coatings of the cylinder.

Physical Characterization

The microstructures of the samples were analyzed by first grinding and polishing the top surface. Silicon carbide paper was used successively with 120, 300, 600 and 1000 grit sandpapers. Samples were then polished on a felt disc with 1 μm, 0.5 μm and 0.3 μm alumina powder until surfaces had a mirror finish. Polished surfaces were then etched with either 15 ml HCl-5 ml $HNO_3$-100 ml $H_2O$ or 100 ml HCl—5 ml $H_2O_2$ (30%) solutions. Each sample was then examined in a field emission scanning electron microscope (FEI Quanta 200, OR). Energy dispersive spectroscopy (EDS) was performed along a cross section of a gradient cylinder with a field emission SEM (FE Sirion, Portland, Oreg.) fitted with a Genesis EDAX detector. X-ray diffraction (XRD) analysis was performed on the coatings using a Cu-K$\alpha$1 radiation.

Mechanical Characterization

The hardness, wear rate, coefficient of friction (COF), and abrasive water resistance of the coating samples were examined. Hardness was measured along the cross section of the coatings using a Vickers micro hardness tester (HMV-2T, Shimadzu, Kyoto, Japan) with a load of 0.9807N and a dwell time of 15s. Three passes were conducted down the depth of each sample and the averages of the top surface were reported.

Wear rate and COF were measured using a Nanovea series tribometer (Microphotonics Inc., Calif. USA). A linear reciprocating wear test was conducted with a spherical pin on the coatings. A silicon nitride ball with a 3 mm diameter was used with a 10 mm stroke length, 5N load, 1200 mm/min speed, and 1 km distance. Tests were done in DI water at room temperature. Images of the wear tracks were taken with an optical microscope to measure the width and calculate approximate wear rate. Force sensors recorded data from the tribometer as it took a measurement every 100 ms and was reported as a sine curve. The average value of the curve was found and made the zero value. The absolute value of the adjustment from the baseline was taken to make all the data positive. Then for every 5000 values the largest 10 were averaged and divided by 5N to normalize the data and attain the static COF.

Abrasive water tests were conducted using an OMAX 2652 JetMachining® Center abrasive water jet (OMAX, Kent, Wash.). Abrasive water was shot at the samples while the jet moved across them at 0.457 m/min. The spot size of the jet was 0.762 mm, shot at 338 MPa with a 454 g/min garnet flow rate. 80 HPA® (High Performance Alluvial) garnet (Barton, StreetGlens Falls, N.Y.) was used as the abrasive. Two tests were run down each coating, and there were two of each type of coating. The cross section of the cut area was then analyzed and compared.

Experimental Results

Figures 5A, 5B:
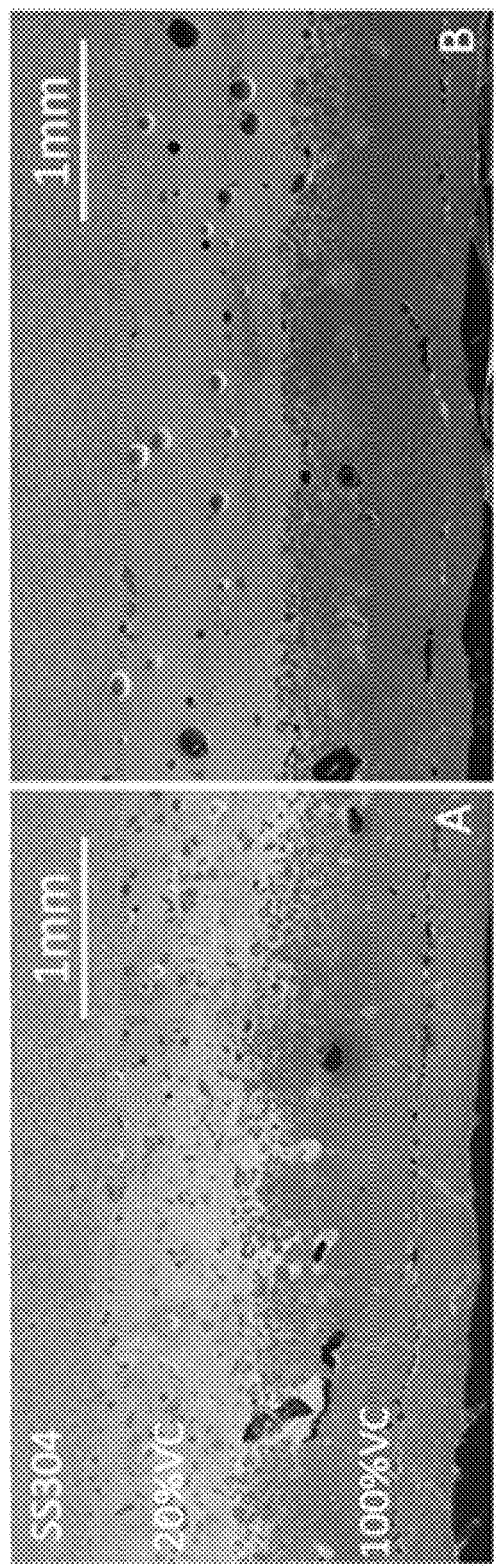
FIGS. 5A-5B are example images of a cross section of a bulk product having vanadium carbide and stainless steel with a gradient coating 100%-20%-0% with no laser pass and gradient coating 100%-20%-0% with laser pass on each layer, respectively, in accordance with embodiments of the disclosed technology.

FIGS. 5A and 5B are images of the two gradient samples. As shown in FIGS. 5A and 5B, double laser pass performed reduced porosity in the bulk of each layer. LENS ™ processing of SS304 resulted in finer grains with a more heterogeneous morphology than applying other techniques. Microstructures of all samples can be seen in FIGS. 6A-6J. All grains in the substrate were much larger and typical of a hot rolled SS304 plate. As shown in FIGS. 6A-6J, LENS™ processing caused a significant decrease in grain size. In the 5%, 10%, and 20% VC samples, the grain structures looked very similar with roughly the same morphology and size as the SS304 but having VC occupying the grain boundaries. As more VC was added, there was more VC occupying the grain boundaries. In the 20% VC laser pass sample, VC was not only on the grain boundaries but also dispersed as small globules in the grains. The structure was substantially homogeneous with no apparent areas devoid of VC.

FIGS. 7A-7F show the coating from FIG. 5B in more detail. In particular, FIG. 7A shows a profile of the coating; FIGS. 7B-7D show respective microstructures of each layer; and FIGS. 7E and 7F show the interfaces between each layer. The interface between the SS304 substrate and 20% VC coating showed a distinctive line where the coating bonded to the substrate. Inspecting the interface showed that there appeared to be no gaps and very few pores between the two zones. There was a distinct line where the grain structures changed size. It appeared that the substrate had no change in grain structure near the interface, which indicates that there was no notable heat affected zone (HAZ) or the HAZ was highly localized. The 100% VC to 20% VC had a much more gradient interface. As 100% VC was deposited, the VC was mixed with primarily SS304 coating and dispersed into roughly 50 μm precipitates. These precipitates were curved and had few sharp edges, which suggests that the VC was dissolving in the surrounding matrix.

The laser pass appeared to densify the metal at the surface, as well as improve the distribution of the VC. When comparing the laser pass to non-laser pass grains in FIGS. 6A-6J, there was a small difference in grain morphology. In the SS304, the grains appeared to become slightly smaller and more homogeneous than non-laser pass samples. In almost all images, VC appeared to be more homogeneously distributed between the grains. The grain morphology also seems more uniform. By visual inspection, the laser pass smoothed out the top surface that was rough prior. As the laser passed on the top surface, the laser created another melt pool to allow the top surface more time for diffusion and for the voids to collapse. The result was a majority of the voids and pores closing and densification of the coating.

XRD Analysis

Figure 8:
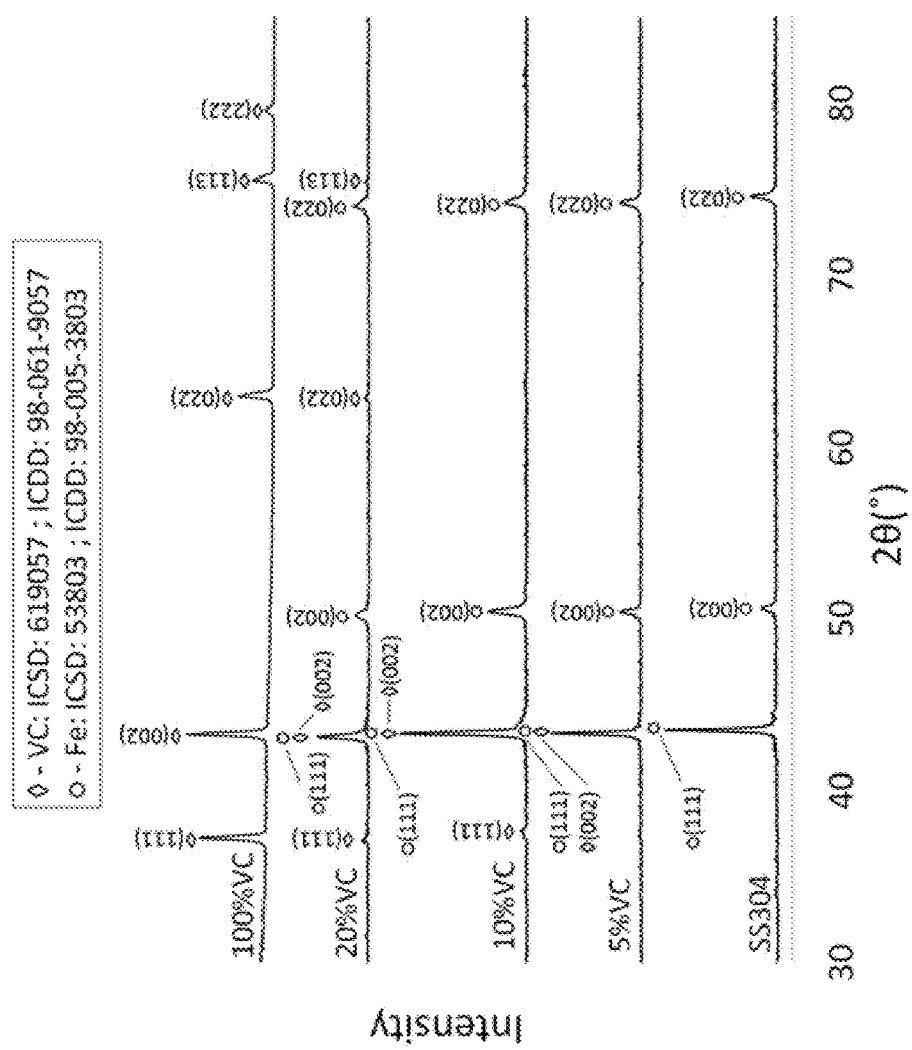
FIG. 8 is an X-ray Diffraction ("XRD") plot of certain coating samples in accordance with embodiments of the disclosed technology.

FIG. 8 shows example XRD curves for certain sample compositions. Analysis of the graphs shows that the SS304 was all FCC-Fe. The 3 peaks present were 43.8°, 51°, and 74.8° (ICSD: 53803, ICDD: 98-005-3803)42. Peaks at 37.2°, 43.7°, 62.9°, and 75.5° are peaks for VC (ICSD: 619057, ICDD: 98-061-9057)43. As VC was added, the large peak had a slight shift to the left. Addition of VC causes lattice strain and increases interplanar spacing of iron. Such increase of spacing may have caused small shifts in the peak. As more VC is added, the more VC peaks begin to develop until there are only VC peaks in the 100% VC sample.

EDS Analysis

Figure 9:
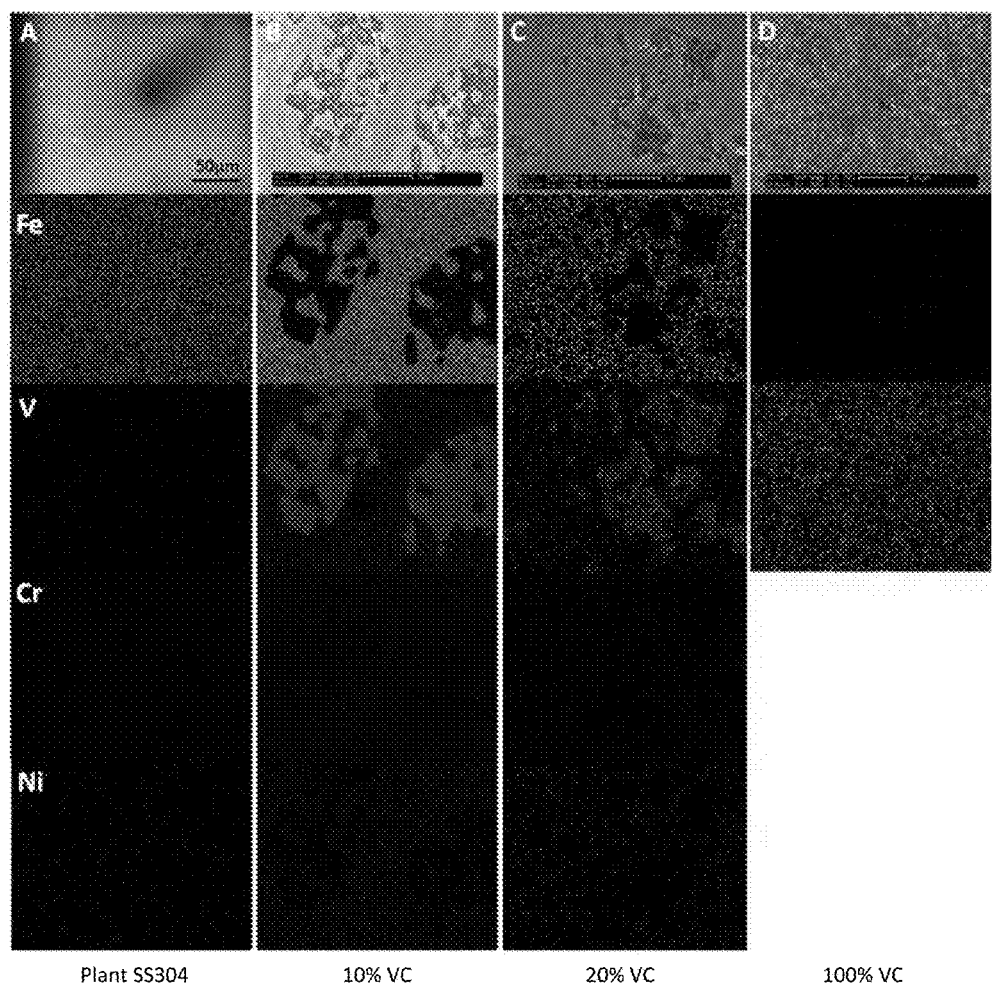
FIG. 9 is an Energy-dispersive detector ("EDS") mapping of iron (Fe), vanadium (V), chromium (Cr), and nickel (Ni) on samples of plate SS304, 10% VC, 20% VC, and 100% VC in accordance with embodiments of the disclosed technology.

FIG. 9 is an image of EDS mapping on samples of SS304 substrate, 10% VC, 20% VC, and 100% VC. As shown in FIG. 9, an area with one of the precipitates was chosen for characterization. The SS304 substrate showed primarily iron and chromium, with generally evenly distributed Ni. The 10% VC image was placed over one of the VC precipitates. By comparing the iron and vanadium maps, FIG. 9 shows the precipitate was VC with no iron present. Though faint, by close inspection of the chromium map, it can be seen that the areas around the precipitate had a higher density of Cr than in the precipitate. VC was still present outside of the precipitate confirming the VC had dissolved into the metal matrix. The 20% VC showed the same trend as the 10% VC with more vanadium surrounding the precipitate. This makes sense considering the higher VC amount. The 100% VC only has the scans for iron and vanadium because no Cr or Ni was detected. As expected the 100% VC had primarily vanadium and only trace amounts of iron.

Hardness Measurements

Figure 10A:
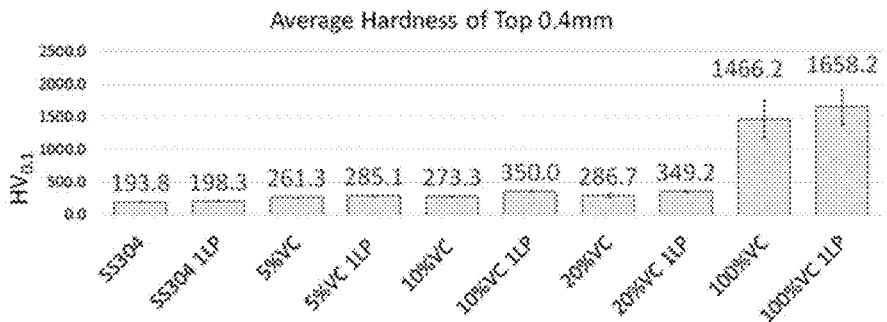
FIGS. 10A-10C are bar graphs illustrating average hardness of top 0.4 minutes, average coefficient of friction ("COF") after 200 minutes, and average wear rate from wear test of certain samples, respectively, in accordance with embodiments of the disclosed technology.

Average hardness of the top surface of the sample coatings are shown in FIG. 10. As shown in FIG. 10A, the hardness increased with increasing carbide content. The 5% VC raised the hardness by 67.5-86.8HV0.1, 10% VC by 79.5-151.7HV0.1, and 20% VC by 92.9-150.9HV0.1-(No LP-LP). The laser pass had a greater impact on the increase in hardness than the addition of more VC after 5% VC. There was also no difference in hardness when comparing the 10% VC and 20% VC. The 100% VC increased hardness by a very large amount compared to the other coatings. The average hardness at the top was 1466.2HV0.1 and 1658.22HV0.1 for the non-laser pass and laser pass samples, respectively. That is a 1272.4-1459.9HV0.1 increase. The standard deviation was very high due to the microporous areas and microcracking. FIG. 8 is an image of the hardness depth profile showing a gradient change down the coating.

Wear Studies

Figure 10B:
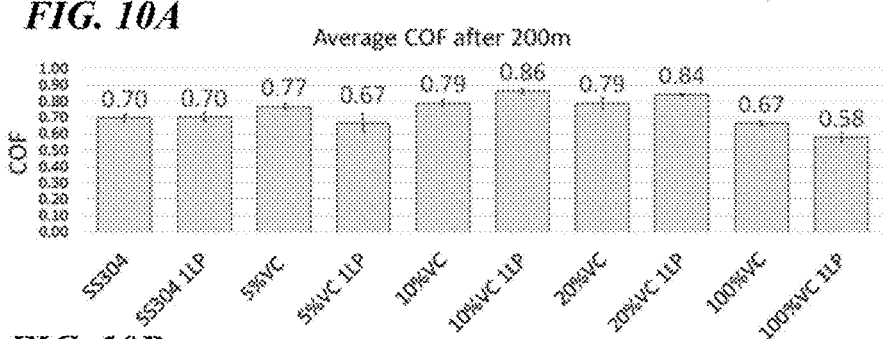

FIG. 10B is a bar graph that shows a bar graph of the average COF after 200 m. As shown in FIG. 10, addition of VC increased the COF in the MMC samples. The COF increased with increasing VC content until 20% VC. 20% VC and 10% VC had the same COF. The laser pass caused a small fluctuation in the COF. The small difference between them could be caused by variation in porosity and not only be a factor of the laser pass. The 100% VC coatings had lower COF than the VC coatings and SS304. The 100% VC with a laser pass had the lowest COF with 0.58, which was 0.12 less than the SS304.

Figure 10C:
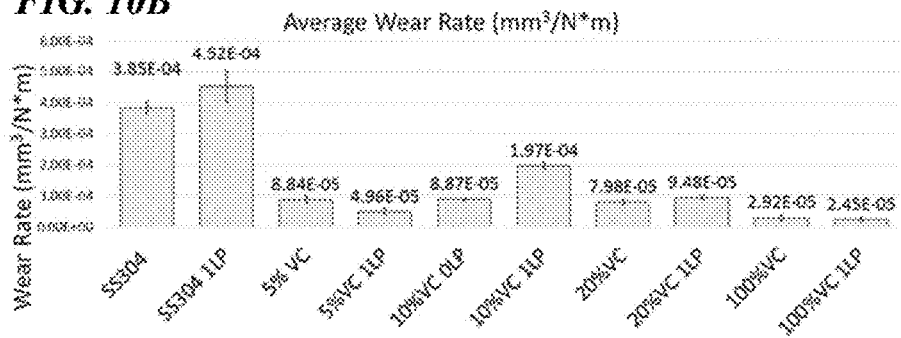

After the wear test, the average wear rate was calculated from the width of the wear track. FIG. 10C shows a bar graph of the average wear rates of the coatings where it can be seen that the addition of VC significantly increased the wear resistance. The SS304 samples were around 4.00E-04, and all the carbide samples were below 1.00E-04 with the exception of 10% VC laser pass.

Abrasive Water Tests

Figure 11:
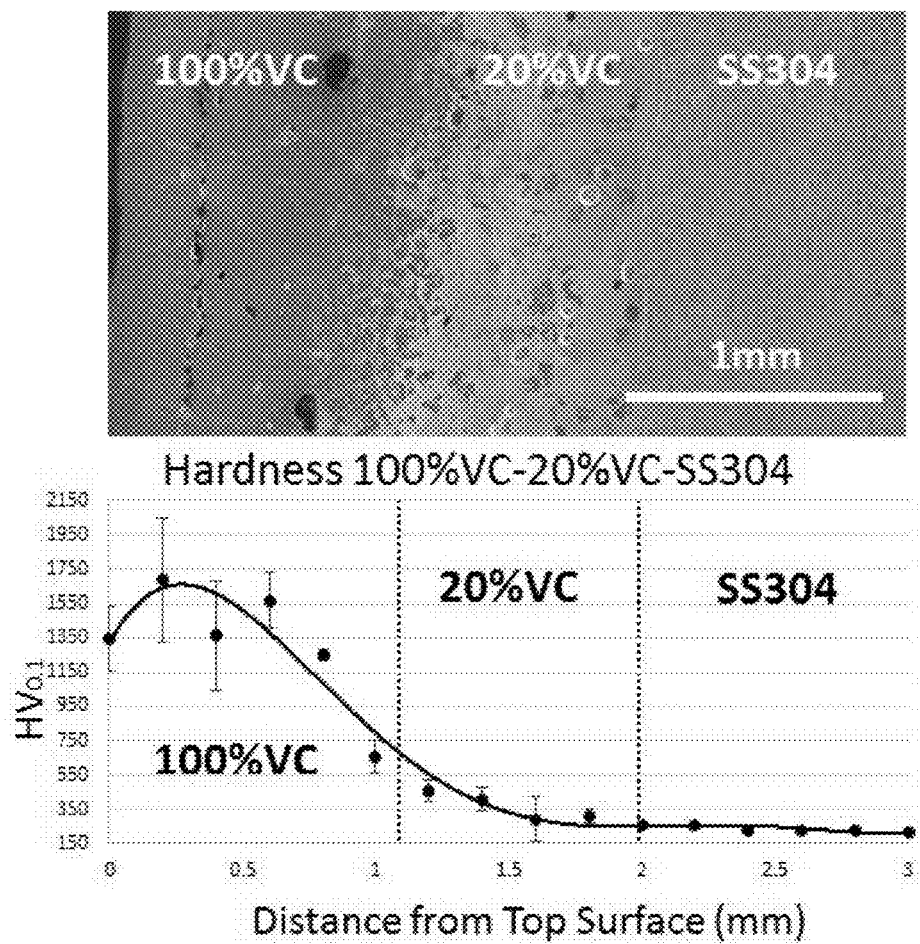
FIG. 11 illustrates a hardness depth profile of gradient coating of a sample in accordance with embodiments of the disclosed technology.

FIG. 11 shows an image of the cross-section and top of the coatings after the abrasive water test. The 20% VC and the SS304 both had considerable material loss. Both had roughly a 1 mm width cut that penetrated 0.5 mm, and the difference between the two was negligible. The 100% VC coating had no noticeable damage. The water jet only changed the surface finish of the 100% VC coating. This shows the 100% VC offers a very protective coating.

Figure 12:
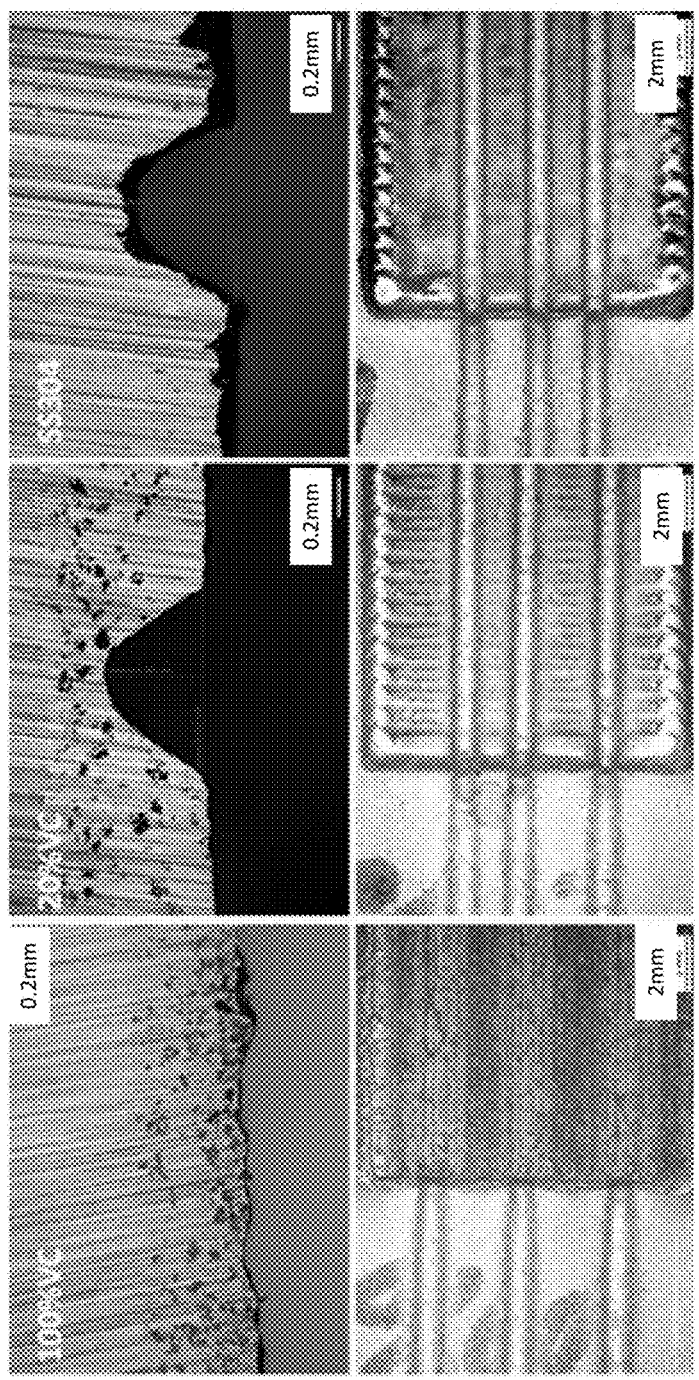
FIG. 12 are cross section and top images of abrasive water jet test of certain coating samples in accordance with embodiments of the disclosed technology.
Figure 13:
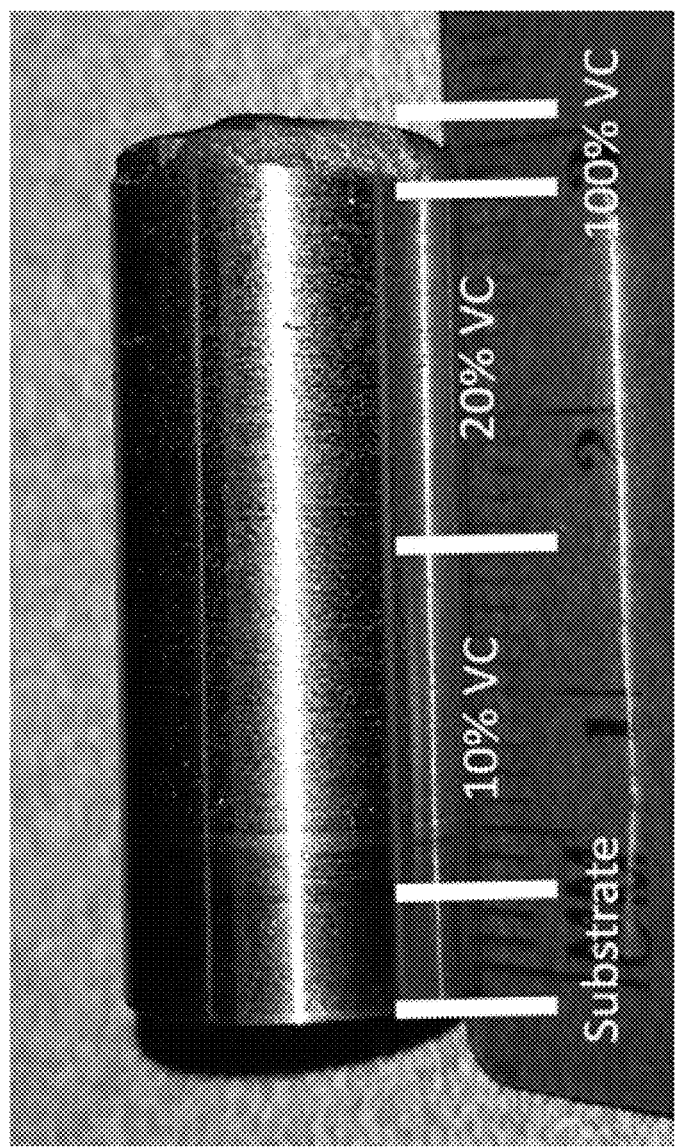
FIG. 13 is an image of an example machined compositionally gradient cylinder ranging from 100% stainless steel to 100% VC ceramic in accordance with embodiments of the disclosed technology.

FIGS. 12 and 13 show gradient cylinders manufactured, including 20 layers of 10% VC, 20 layers of 20% VC, and 5 layers of 100% VC. The cylinder exhibited ability to be machined except for the 100% VC coating. This cylinder shows that additive deposition technologies such as LENS™ can be applied to add material to stainless steel parts based on operational needs such as wear and erosion resistance.

The results of the experiments showed that the VC agglomerated on the grain boundaries and also integrated into the grains of the composite material. VC is believed to have a solubility limit temperature from 1100° C. to 1150° C. in austenite. The melting point of SS304 is 1399° C. to 1454° C. Since the SS304 was melted, the temperature was well above the solubility temperature and some of the VC dissolved in the metal matrix. The VC that was residing on the grain boundaries could be for two different reasons. One is the matrix could have been fully saturated with VC so no more could dissolve into the grains. With nowhere else to go, the VC precipitated on the grain boundaries. The other reason could be the melt pool solidified so fast the VC did not have time to dissolve in the metal matrix. If the second reason were the case due to non-equilibrium solidification, more time for diffusion would cause the VC to dissolve into the grains.

The added VC strengthened the steel in a variety of ways. The high thermal gradient of cooling coupled with different constituents having dissimilar coefficients of thermal expansion result in cure stress left in the coatings. This was verified by the XRD peak shift which indicated there was strain in the lattice. The internal stress and retained VC can increase the hardness of the coatings. It is believed that fast solidification of metal around intermetallic reinforcements can lead to strong matrix-particle bonding and helps the load transfer across the interfaces of the phases. The VC also can act to deflect and impede crack propagation. In the past, intermetallic materials on grain boundaries have restrained dislocation movement. The VC can also act as an obstacle that can arrest or deflect a crack, increasing the effective mean path, and allow for more deformation before failure. This can help increase the strength at high temperatures when the Peierls stress is reduced and the strength of the matrix is lowered.

Presence of VC at the grain boundaries is believed to also increase the wear resistance by acting as an abrasive particle as well as increased hardness. When comparing wear resistance, the SS304 sample was much less than the VC coated samples. As wear occurs on the MMC samples, the relatively softer SS304 begins to damage first, exposing the VC on the grain boundaries. The dispersed VC on the grain boundaries are abrasive and can protect the worn away steel. These precipitates over time can be pulled out and the debris, if trapped in the area of contact, will continue to act as an abrasive particles. The result is an increase in COF due to the abrasive particles.

As more carbides were added to the microstructure, the grains appeared to become finer. It is believed that VC impeded grain growth and produced a finer grain structure in these coatings. As more VC was added, VC became widely dispersed, which inhibited grain growth even more. These small grains are ideal for the coating because they can also increase the strength of a metal due to grain size strengthening effects. Also, finely distributed VC particles can improve creep strength in steels. Microstructural images show bonding between the substrate and the coating had few to no defects. That there are no large pores or voids shows the VC does not alter the ability for a coating to bond to the substrate. The interface between the 100% VC and 20% VC was much more gradual as VC precipitates diffuse into the coating.

The laser pass appeared to generate a more homogeneous distribution of VC. This is believed to be caused by the reheating and extended diffusion time during laser pass. The solidification rate of the melt pool does not change, neither does the grain structure or morphology. Since no more VC is being added, the laser pass is only allowing for the existing VC to become mobile. This mobility allows for more diffusion and results in a more homogeneous dispersion of VC.

The ability to apply a protective gradient coating yields advantages over adding a single ceramic coating. A gradual change in material properties can reduce the likelihood of cracking and improve interfacial strength. VC has a high modulus and is brittle compared to the SS304. If a high load is applied, the underlying steel can undergo more deformation than the VC. This difference in strain can cause cracking or delamination of the coating. By having the modulus change gradually from the surface to the bulk material composed of stainless steel or other suitable substrate materials, the strain gradient would be more gradual and the probability of cracking or delamination would decrease. Such an approach can be used to increase service life of many stainless steel parts particularly in harsh environments.

Processing of Aluminum Oxide (Al2O3) on titanium (Ti)

In additional experiments, LENS™ was utilized to fabricate a Ti/Al$_2$O$_3$ functionally graded material ("FGM") with different sections of pure Ti6Al4V alloy, Ti$_6$Al$_4$V+Al$_2$O$_3$ composites, and pure Al$_2$O$_3$ ceramic. After processing, microstructural characterization, phase analysis, elemental distribution, and micro-hardness measurements were performed on cross sections of Ti/Al$_2$O$_3$ FGM samples. Each section had unique microstructures and phases. Moreover, hardness measurements demonstrated that pure Al$_2$O$_3$ section had the highest hardness of 2365.5±64.7 HV0.3. Results showed that additive manufacturing can be used in processing functional multi-material composites in one operation while maintaining the size and shape of the component based on its computer aided design file.

Experimental Procedure

Fused aluminum oxide powder (Atlantic Equipment Engineers, Bergenfield, N.J., AL-604, purity of 99.9%) with the particle size range of 44 μm to 74 μpm (−200/+325 mesh) and gas atomized Ti$_6$Al$_4$V powder (ATI Powder Metals, Pittsburgh, Pa., Grade 5 with oxygen content of 0.2%) with powder size range of 44 μm to 149 μm (−100/+325 mesh) were utilized for Ti/Al$_2$O$_3$ FGM fabrication. Additionally, each powder was sieved by a mechanical sieve shaker for ~10 min, and then collected the powders with size range of 44 μm to 74 μm to achieve best build performance. A LENS™ 750 system (Optomec Inc., Albuquerque, N. Mex.) was used to produce Ti/Al$_2$O$_3$ FGM. The unit was purged with argon gas with gas pressure of ~35 psi until the oxygen level dropped below ~10 ppm in chamber. The laser source with a 500 W continuous wave Nd:YAG was applied to build the FGM on a thickness of 3 mm grade 5 Ti$_6$Al$_4$V substrate. The Al$_2$O$_3$ powder and Ti6Al4V powder were separately loaded in powder feeder 1 and powder feeder 2 correspondingly.

The target FGM had a cylindrical shape with a diameter of 12.7 mm. Moreover, both hatch distance and layer thickness were pre-set as 0.381 mm for laser processing. The whole Ti/Al$_2$O$_3$ FGM cylinder includes four sections. Table 3 below shows the processing parameters that used to fabricate of Ti/Al$_2$O$_3$ FGM by LENS™ method in general.

TABLE 3

Processing parameters of LENS ™ fabricated Ti/Al$_2$O$_3$ FGM

| Section | Laser Power (W) | Powder Feed Rate (g/min) | | Laser Scan Speed (mm/min) | |
| --- | --- | --- | --- | --- | --- |
| | | Powder Feeder 1 (Al$_2$O$_3$) | Powder Feeder 2 (Ti6Al4V) | Hatch Scan Speed | Contour Scan Speed |
| LENS ™ fabricated Ti6Al4V | ~425 | N/A | ~13 | 0.6 | 0.7 |
| Ti6Al4V + Al$_2$O$_3$ | ~400 | ~20 | ~13-1/~7-13 | 0.8 | 1 |
| Pure Al$_2$O$_3$ | ~400 | ~13 | N/A | 0.8 | 1 |

In the first section, only Ti6Al4V powder was deposited on Ti6Al4V substrate with a laser power of ~425 W, a scanning speed of 0.6 mm/min, a contour scanning speed of 0.7 mm/min and a powder feed rate of ~13 g/min. 16 layers in total were built in this LENS™ processed pure Ti6Al4V section; a Ti$_6$Al$_4$V+Al$_2$O$_3$ section was fabricated on top of the previous section. Fabrication of Ti$_6$Al$_4$V+Al$_2$O$_3$ section used both powder feeders while dynamically adjusting the powder feeding rates. Specifically, a fixed powder feeding rate of ~20 g/min was applied for Al$_2$O$_3$ powder feeder while the powder feeding rate of Ti$_6$Al$_4$V powder feeder was manually controlled from ~13 g/min to ~1 g/min through layer by layer fabrication. 13 layers of Ti/Al$_2$O$_3$ FGM were made with a laser power of 400 W, a hatch scanning speed of 1 mm/min and a contour scanning speed of 0.8 mm/min; the third section was pure Al$_2$O$_3$. Ti$_6$Al$_4$V powder feeder was fully closed and only allowing deposition of Al$_2$O$_3$ above Ti$_6$Al$_4$V+Al$_2$O$_3$ section. A powder feeding rate of ~18 g/min was utilized. Furthermore, the same laser power was applied as in the previous section, as well as hatch and contour scanning speed. In total 12 layers were achieved in the pure Al$_2$O$_3$ section; another Ti$_6$Al$_4$V+Al$_2$O$_3$ section was built upon pure Al$_2$O$_3$ section. The processing parameters were the same that were used in the second section, beside that the powder feeding rate of Ti6Al4V powder feeder was adjusted from ~7 g/min to 13 g/min during the laser processing. 8 layers of Ti/Al$_2$O$_3$ FGM were built in this section.

The cylindrical Ti/Al$_2$O$_3$ FGM structure was cut transversely by using a low speed diamond saw to exam the cross section. The cross sections of sample were well ground by sandpapers with grits from 120 to 2000. Polishing was performed using 1 μm, 0.5 μm and 0.03 μm alumina suspension to achieve final surface finishing. The sample was cleaned by ultrasonicating with 75% ethanol solution for 30 min, then blow dried with air gun.

XRD characterization was performed on the cross section of sample by utilizing X-ray diffractometers (PANalytical, Netherlands) with radiation source of Cu-Kα, a step size of 0.05° and a 2θ range of 20-80°. Furthermore, sample's cross section was etched before SEM characterization by using Kroll's reagent (92 mL DI water, 2 mL HF and 6 mL HNO$_3$).

Morphology and elemental distribution of sample cross section were characterized by SEM (FEI, Hillsboro, Oreg., Quanta) and EDS system (EDAX, AMETEK, Pa.) respectfully.

A micro hardness tester (Phase II, N.J.) was used to obtain a sample cross section micro hardness profile with a load of 2.942 N (HV0.3) and a dwell time of 15 seconds. Specifically, five sets of diamond indentations were applied on each LENS™ processed Ti/$Al_2O_3$ FGM section. Each set contained four indentations distributed at different depth. Additionally, depth was varied due to the variation of geometry of each LENS™ built sections. The micro hardness of $Ti_6Al_4V$ substrate was tested as well to obtain the complete hardness profile across the cross section.

Experimental Results

Figure 14:
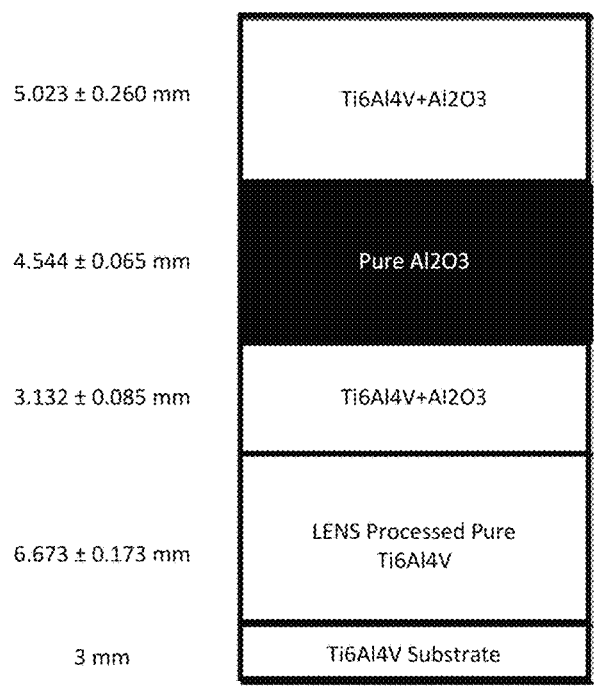
FIG. 14 is a schematic diagram illustrating a fabricated Ti/Al2O3 functionally graded material cylinder with measurements of thickness of each section in accordance with embodiments of the disclosed technology.

Multiple compositional cylindrical structures of Ti/$Al_2O_3$ FGM were fabricated by LENS™ processing on a $Ti_6Al_4V$ substrate with using adjusted processing parameters. FIG. 14 shows a schematic diagram of a Ti/$Al_2O_3$ FGM sample with thickness measurements of each section of the fabricated Ti/$Al_2O_3$ FGM cylinder. In addition, microstructure, elemental distribution, phase formation and micro hardness were studied in each individual section. Graded microstructures were revealed with SEM characterization. In addition, each section had unique morphology caused by temperature, compositional variations, as well as phase transformation which will be discussed later.

Figure 15:
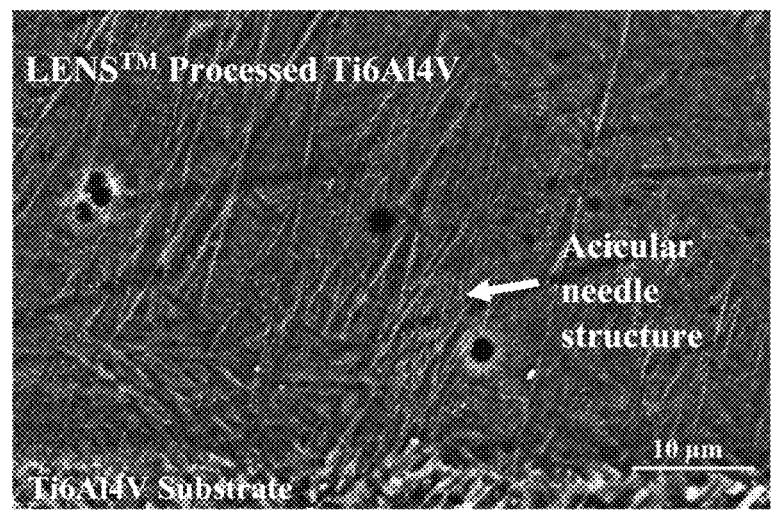
FIG. 15 is a SEM microphotograph that shows morphology of near interface of Ti6Al4V substrate and LENS™ processed Ti6Al4V at 500× in accordance with embodiments of the disclosed technology.
Figure 16A:
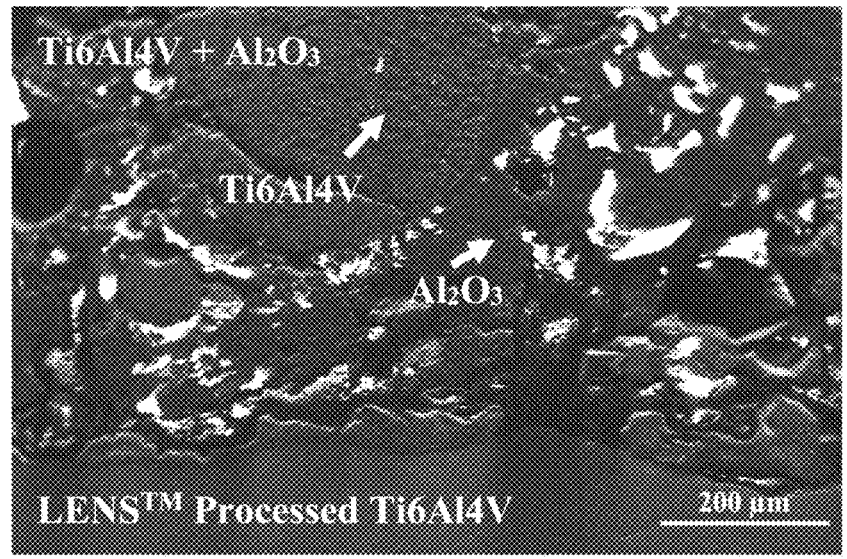
FIGS. 16A and 16B are SEM micrographs that show morphology of near interface of LENS™ processed Ti6Al4V and Ti6Al4V and Al2O3 graded material at 125× and 1500×, respectively, in accordance with embodiments of the disclosed technology.
Figure 16B:
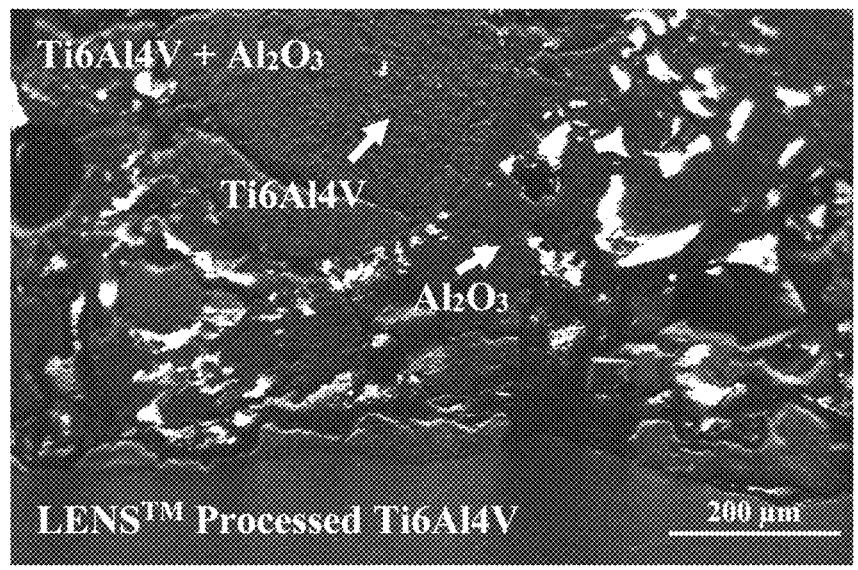

FIG. 15 is a SEM microphotograph of the interface region between the $Ti_6Al_4V$ substrate and processed $Ti_6Al_4V$. Acicular needle structures were found and grew toward the building direction. Additionally, a smooth transition from substrate to processed $Ti_6Al_4V$ was seen. FIGS. 16A and 16B are SEM microphotographs that show microstructures around the interface of processed $Ti_6Al_4V$ and $Ti_6Al_4V$+$Al_2O_3$ sections in low and high magnification. FIG. 16A shows that a sharp transition was found between LENS™ processed $Ti_6Al_4V$ and $Ti_6Al_4V$+$Al_2O_3$ sections. Furthermore, the $Ti_6Al_4V$ region and $Al_2O_3$ region could be distinguished clearly in $Ti_6Al_4V$+$Al_2O_3$ section. FIG. 16B shows that the acicular needle structures were obtained in the processed $Ti_6Al_4V$ section. These acicular need structures were finer compared to the similar structures in FIG. 15.

Figure 17A:
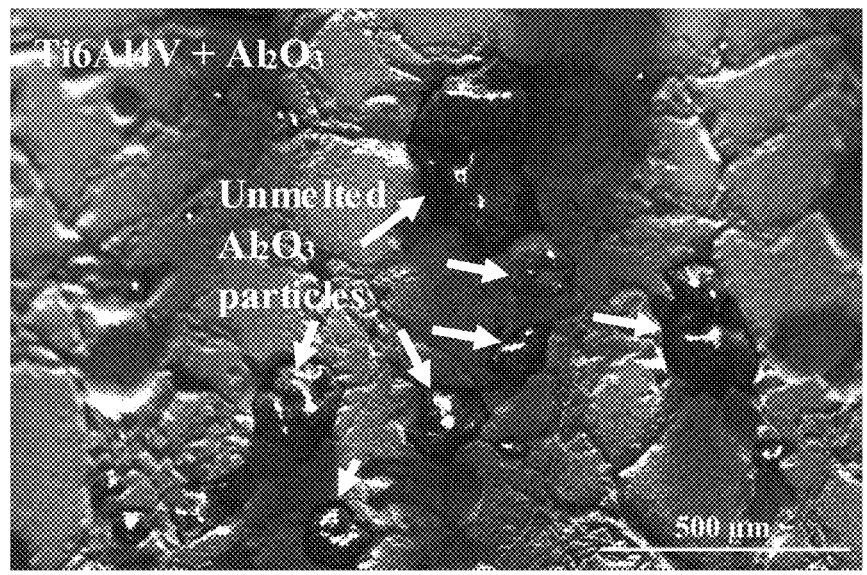
FIG. 17A and 17B are SEM micrographs that show morphology of Ti6Al4V and Al2O3 graded material at 70× and 1500×, respectively, in accordance with embodiments of the disclosed technology.
Figure 17B:
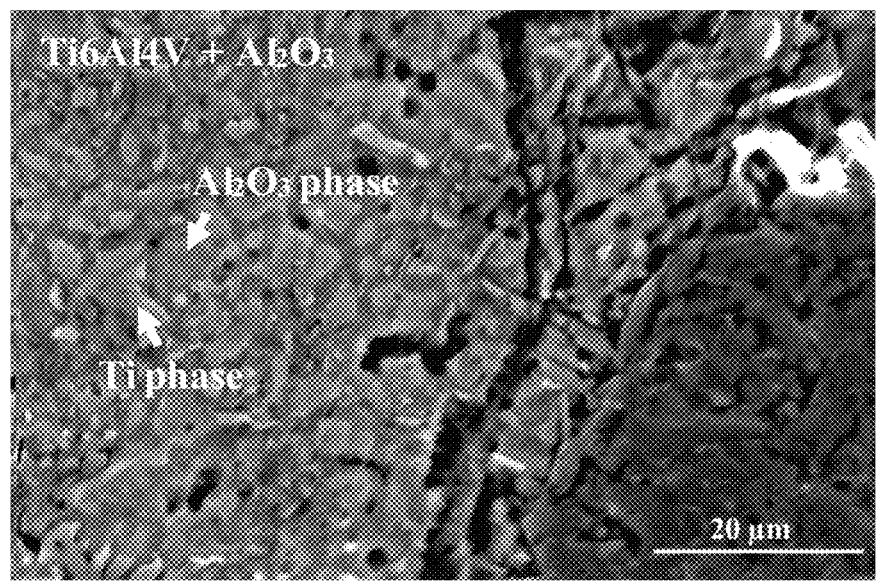
Figure 18:
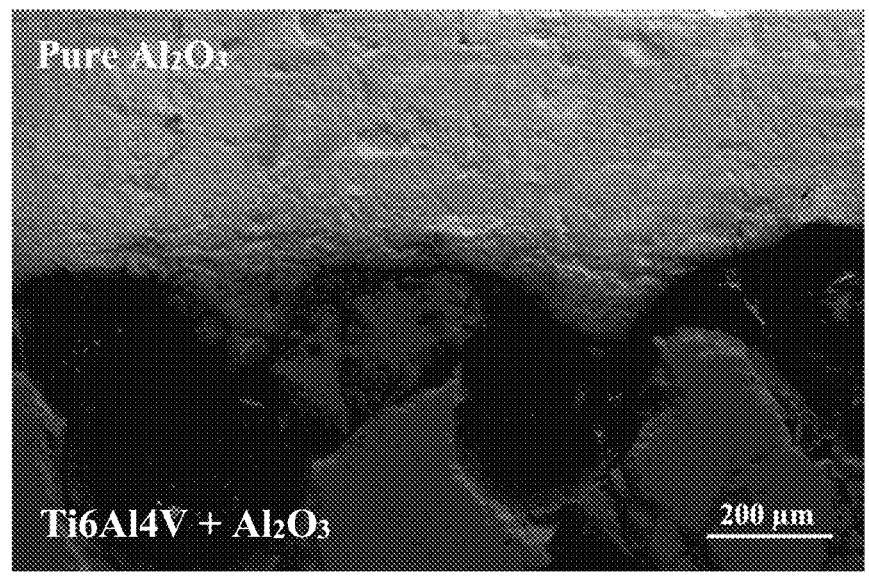
FIG. 18 is a SEM micrograph that shows morphology of near interface of Ti6Al4V and Al2O3 graded material and pure Al2O3 section at 90× in accordance with embodiments of the disclosed technology.
Figure 19:
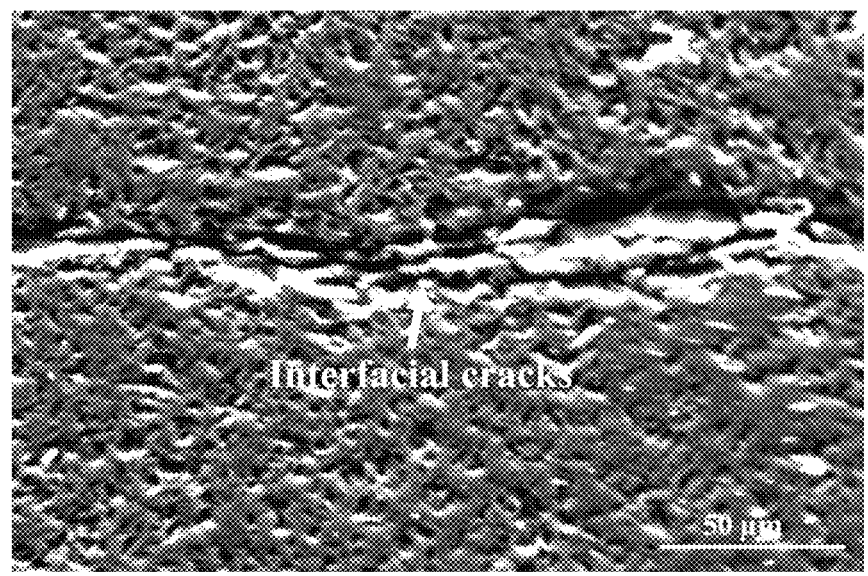
FIG. 19 is a SEM micrograph that shows morphology of pure Al2O3 section at 538× in accordance with embodiments of the disclosed technology.

As shown in FIG. 17A, few un-melted $Al_2O_3$ particles were embedded in the matrix of $Ti_6Al_4V$+$Al_2O_3$. FIG. 17B shows some equiaxial grains and polyhedral morphology in $Ti_6Al_4V$+$Al_2O_3$ section. FIG. 18 illustrates the morphology near the interface of the $Ti_6Al_4V$+$Al_2O_3$ section and pure $Al_2O_3$ section. Compared to the porous structure of $Ti_6Al_4V$+$Al_2O_3$, a dense pure $Al_2O_3$ structure could be recognized. FIG. 19 is the morphology of the pure $Al_2O_3$ section at 538×. No un-melted $Al_2O_3$ particles were found in the pure $Al_2O_3$ section. However, interfacial cracks were present.

Figure 20:
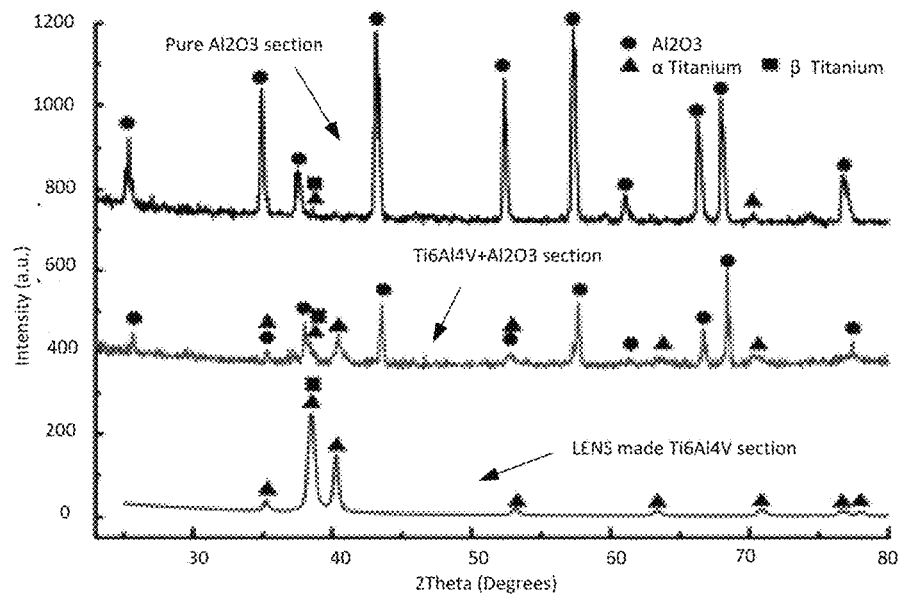
FIG. 20 is a graph illustrating XRD patterns of LENS™ processed Ti6Al4V, Ti6Al4V+Al2O3 and pure Al2O3 sections of samples in accordance with embodiments of the disclosed technology.
Figure 21:
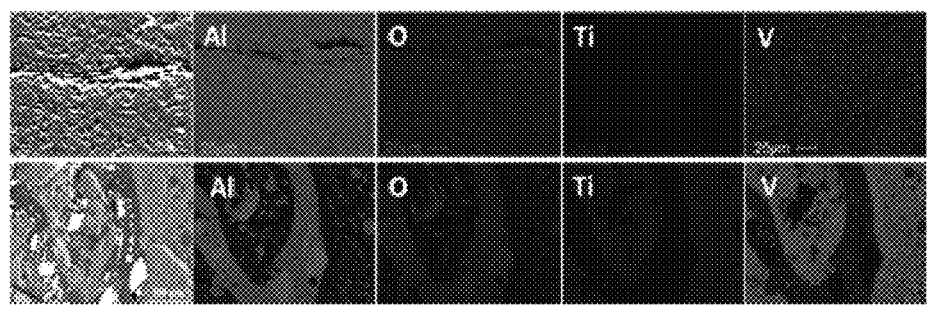
FIG. 21 illustrates EDS mapping at (a) pure Al2O3 section and (b) Ti6Al4V+Al2O3 section in accordance with embodiments of the disclosed technology.

FIG. 20 illustrates XRD patterns of LENS™ processed $Ti_6Al_4V$, $Ti_6Al_4V$+$Al_2O_3$ and pure $Al_2O_3$ sections of samples. As shown in FIG. 20, α-Ti and β-Ti phases were obtained in the LENS™ processed Ti6Al4V section. In addition, β-Ti was the dominated phase in this section. α-Ti, β-Ti and corundum phases were observed in $Ti_6Al_4V$+$Al_2O_3$ section. The intensity of α-Ti and β-Ti phases were low compared to corundum phase. Furthermore, corundum phase and a very small amount of Ti phase were obtained in pure $Al_2O_3$ section with strong intensity. EDS mapping of $Ti_6Al_4V$+$Al_2O_3$ section and pure $Al_2O_3$ sections are shown in FIG. 21. As shown in FIG. 21, the elemental distribution shows that Al and O elements were the dominant elements in pure $Al_2O_3$ section, and only a very small amount of Ti and V elements could be found. Moreover, the EDS mapping of $Ti_6Al_4V$+$Al_2O_3$ section gave the distributions of Al, O, Ti and V.

Figure 22:
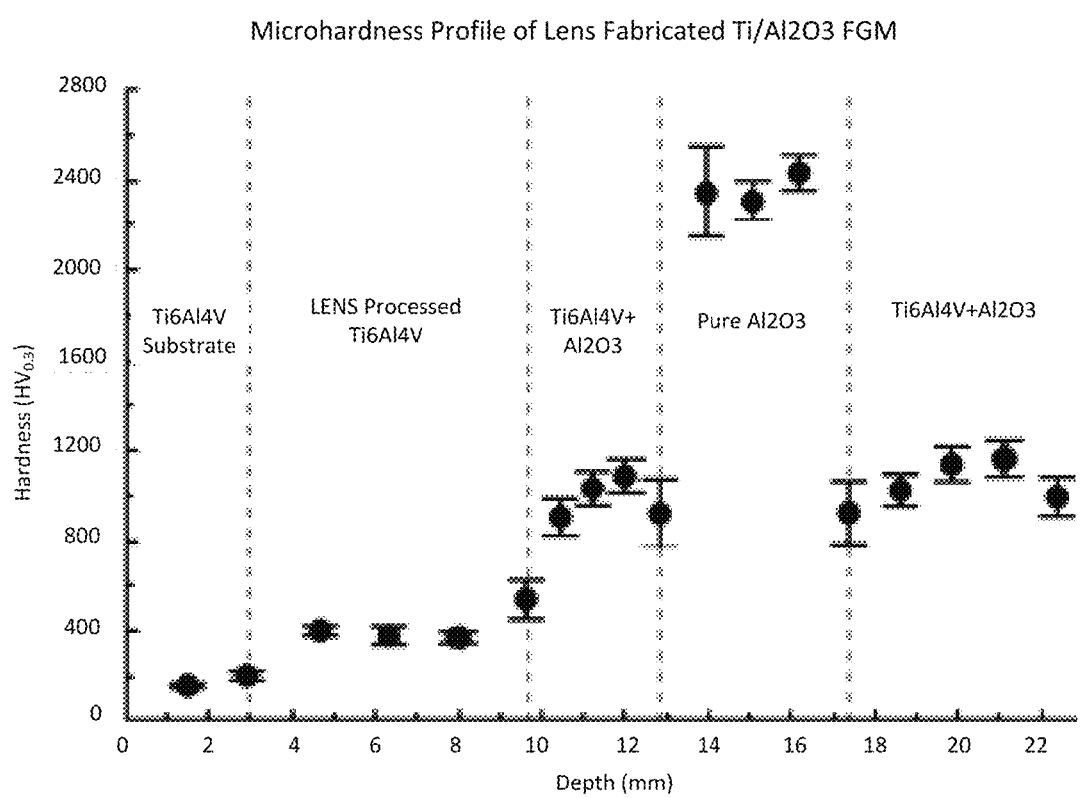
FIG. 22 is a graph illustrating micro-hardness vs. depth profile of LENS™ fabricated Ti/Al2O3 functionally graded materials in accordance with embodiments of the disclosed technology.

FIG. 22 is a graph that illustrates overall micro-hardness profile through the cross section of LENS™ fabricated Ti/$Al_2O_3$ FGM. As shown in FIG. 22, the average $Ti_6Al_4V$ substrate hardness value was 183.2±30.4 HV0.3. The microhardness gradually increased in LENS™ fabricated $Ti_6Al_4V$ section which had an average hardness value of 421.5±77.1 HV0.3. The hardness value grown sharply in the first LENS™ fabricated $Ti_6Al_4V$+$Al_2O_3$ section with an average hardness value was 987.9±87.4 HV0.3. A substantial hardness enhancement was found in the pure Al2O3 section, where the average hardness was 2365.5±64.7 HV0.3. The second LENS™ fabricated $Ti_6Al_4V$+$Al_2O_3$ section had a similar average hardness value compared to the first one at 1050.25±99.7 HV0.3.

The micro-hardness measurement showed that the pure $Al_2O_3$ section had the highest hardness value among the LENS™ fabricated Ti/$Al_2O_3$ FGM. Specifically, the hardness value in pure $Al_2O_3$ section is about 13 times, 6 times and 2 times higher than $Ti_6Al_4V$ substrate, LENS™ fabricated Ti6Al4V section, and $Ti_6Al_4V$+$Al_2O_3$ section, respectively. In addition, increased micro-hardness values were found close to the interfaces between $Ti_6Al_4V$ substrate and LENS™ fabricated $Ti_6Al_4V$ section, and LENS™ fabricated $Ti_6Al_4V$ section and $Ti_6Al_4V$+$Al_2O_3$ section. However, no such enhancement of micro-hardness was found near the interface of $Ti_6Al_4V$+$Al_2O_3$ section and pure $Al_2O_3$ section; the hardness remains similar to non-interface regions. Overall, each section has unique micro-hardness profile.

As discussed above, the cross-sectional SEM microphotographs of Ti/$Al_2O_3$ revealed graded microstructures in each section. In the LENS™ fabricated $Ti_6Al_4V$ section, the acicular needle shape microstructures, which are Widmanstatten α-Ti laths, were the dominated microstructures. In addition, size variation could be found in this type of microstructure. LENS™ is a layer-by-layer manufacturing method which involves high power laser as energy source. As such, early deposited $Ti_6Al_4V$ layers could experience annealing while the fresh new layers are deposited on the top. The annealing could result a secondary precipitation in the retained β-Ti phase. The coarse α-Ti laths may be the consequence of the primary precipitation in solid state of α-Ti in β-Ti Phase at the initial stage. The fine α-Ti laths, however, could be a result of solid state secondary precipitation as the deposition keeps on.

XRD analysis confirmed the microstructure characterization. During the laser deposition, the powder was melted which may involves phase transformation. Titanium has a close-packed hexagonal α-Ti phase at ambient temperature and pressure. When the temperature elevates to ~890° C., α-Ti experiences a phase transformation to β-Ti which has a BCC crystal structure. The β-Ti remains stable to the melting temperature. Furthermore, Ti6Al4V powder which contains a phase stabilizer (Al) and β phase stabilizer (V) was utilized in this study. $Ti_6Al_4V$ consists both α-Ti phase and original β-Ti at ambient temperature. In addition, the required energy of α-Ti to β-Ti phase transformation is lower than the original β-Ti to β-Ti, which means original β-Ti→β-Ti can only occur after all α-Ti phase are transformed into β-Ti[30]. However, the α phase stabilizer in $Ti_6Al_4V$ can raise the α-Ti→β-Ti transition temperature which makes the phase transformation difficult. Thus, the α-Ti could not fully transform into β-Ti when high powered laser is involved. And the β-Ti shown in the XRD results should contain both transformed β-Ti and original β-Ti.

Corundum, known as α-$Al_2O_3$, is the most thermodynamically stable $Al_2O_3$ crystalline phase.

The crystal structure of corundum is close-packed hcp which is constructed by hcp stacking of the $O^{2-}$ with the occupation of $Al^{3+}$ at two-thirds of the octahedral interstices. In this study, the corundum phase is a eutectic phase due to the solidification from near liquid phase. The XRD result of pure $Al_2O_3$ section shows very small amounts of Ti phase due to experimental error. Based on previous research, α-$Al_2O_3$ was the only phase found in LENS™ fabricated $Al_2O_3$ material, which confirmed the results. Additionally, the elemental distribution agrees with XRD results. In this research, the SEM imaging utilized a back-scattered electron detector (BSE) which gives bright-dark contrast. The BSE can detect backscattered electrons which is caused by elastic scattering. Elements with greater atomic number have higher possibility of producing elastic collision and vice versa. Therefore, the "brighter" area in SEM microphotographs is Ti microstructure, the "dark" area is $Al_2O_3$ microstructure. This can be confirmed by the EDS results as well.

The micro-hardness profile reveals differences of hardness in the substrate and LENS™ abricated $Ti_6Al_4V$, even though they are both $Ti_6Al_4V$ based material. Commercially available grade 5 $Ti_6Al_4V$ normally experiences heat treatment like annealing. Thus, these substrates have large grains. The LENS™ fabricated $Ti_6Al_4V$ involved rapid solidification, therefore finer microstructures could be obtained. The micro-hardness differences in $Ti_6Al_4V$ substrate and LENS™ fabricated $Ti_6Al_4V$ are caused by difference of grain size and can be explained by the Hall-Petch relationship. The elevation of hardness in $Ti_6Al_4V$+$Al_2O_3$ section is resulted by the introduction of $Al_2O_3$ phase.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for additive deposition on a substrate having a surface, comprising:
providing an energy stream into a deposition environment, the provided energy stream having a focal point;
introducing a first precursor material at a first flow rate and a second precursor material at a second flow rate into the deposition environment at or near the focal point of the provided energy stream, the provided energy stream causing the first and second precursor materials to melt and solidify to form a composite material on the surface of the substrate, the composite material having a composition of the first and second precursor materials corresponding to a ratio of the first flow rate and the second flow rate; and
varying at least one of the first or second flow rate as a function of time or location, thereby forming a target product having multiple composition materials with a composition gradient of the first or second precursor material along at least one dimension of the substrate, wherein varying at least one of the first or second flow rate includes:
maintaining the first and second flow rate for a first layer of the composite material on the surface of the substrate; and
subsequent to forming the first layer,
continuing providing the energy stream on the first layer without introducing the first and second precursor materials; and
subsequently, adjusting at least one of the first or second flow rate when forming a second layer of the composite material on the first layer of the composite material.

2. The method of claim 1 wherein:
the first precursor material is a metal;
the second precursor material is a ceramic; and
varying at least one of the first or second flow rate includes varying at least one of the first or second flow rate as a function of time or location on the substrate, thereby forming the target product having a first end composed of 100% of the metal, a second end composed of 100% ceramic, and the composition gradient changes from 100% of the metal at the first end to 100% of the ceramic at the second end along at least one dimension of the target product.

3. The method of claim 2 wherein the composition gradient is sufficient to avoid the ceramic at the second end from being delaminated from the metal at the first end.

4. The method of claim 1 wherein:
the first precursor material is a metal or an alloy of aluminum (Al), iron (Fe), titanium (Ti), cobalt (Co), chromium (Cr), zirconium (Zr), niobium (Nb), tantalum (Ta), tungsten (W), copper (Cu), or nickel (Ni);
the second precursor material is a metal or non-metallic elemental solid based carbide, oxide, nitride, or boride in which the metallic or non-metallic elemental solid composition is one or more of titanium (Ti), vanadium (V), Nickle (Ni), tungsten (W), niobium (Nb), silicon (Si), aluminum (Al), tantalum (Ta), zirconium (Zr), chromium (Cr), or cobalt (Co); and
varying at least one of the first or second flow rate includes varying at least one of the first or second flow rate as a function of time or location on the substrate, thereby forming the target product having a first end composed of 100% of the metal or metal alloy, a second end composed of 100% carbide, oxide, nitride, or boride, and the composition gradient changes from 100% of the metal or metal alloy at the first end to 100% of carbide, oxide, nitride, or boride at the second end along at least one dimension of the target product.

5. The method of claim 1 wherein:
the energy source is a laser, microwave, plasma, electron beam, induction heating, or resistance heating energy source.

6. The method of claim 1 wherein:
the target product is a cylinder; and
varying at least one of the first or second flow rate includes varying at least one of the first or second flow rate as a function of time or location on the substrate, thereby forming the target product having at least one of a first composition gradient along a radial direction or a second composition gradient along an axial direction of the cylinder.

7. The method of claim 1 wherein introducing a first precursor material at a first flow rate and a second precursor material at a second flow rate into the deposition environment includes:
introducing the first precursor material of vanadium carbide (VC) and the second precursor material of stainless steel into the deposition environment.

8. The method of claim 1 wherein the composition gradient changes linearly or step-wise along at least one dimension of the substrate.

\* \* \* \* \*